United States Patent
Sissom et al.

(10) Patent No.: US 12,264,803 B2
(45) Date of Patent: Apr. 1, 2025

(54) LIGHT OUTPUT SYSTEM WITH REFLECTOR AND LENS FOR HIGHLY SPATIALLY UNIFORM LIGHT OUTPUT

(71) Applicant: Magic Leap, Inc., Plantation, FL (US)

(72) Inventors: Bradley Jay Sissom, Boulder, CO (US); Heidi Leising Hall, Webster, NY (US); Kevin Curtis, Boulder, CO (US)

(73) Assignee: MAGIC LEAP, INC., Plantation, FL (US)

( * ) Notice: Subject to any disclaimer, the term of this patent is extended or adjusted under 35 U.S.C. 154(b) by 0 days.

(21) Appl. No.: 18/315,415

(22) Filed: May 10, 2023

(65) Prior Publication Data

US 2023/0280017 A1    Sep. 7, 2023

Related U.S. Application Data

(63) Continuation of application No. 17/856,829, filed on Jul. 1, 2022, now Pat. No. 11,692,689, which is a
(Continued)

(51) Int. Cl.
*F21V 13/04* (2006.01)
*F21V 8/00* (2006.01)
(Continued)

(52) U.S. Cl.
CPC .............. *F21V 13/04* (2013.01); *G02B 6/005* (2013.01); *G02B 6/0076* (2013.01);
(Continued)

(58) Field of Classification Search
CPC .......... G02B 2027/0174; G02B 6/0076; G02B 6/0031; G02B 6/0028; G02B 6/0035;
(Continued)

(56) References Cited

U.S. PATENT DOCUMENTS 1,993,580 A    3/1935  Abbott
5,037,191 A    8/1991  Cheng
(Continued)

FOREIGN PATENT DOCUMENTS

CN    1993580 A    7/2007
CN    101324747 A    12/2008
(Continued)

OTHER PUBLICATIONS

ARToolKit: https://web.archive.org/web/20051013062315/http://www.hitl.washington.edu:80/artoolkit/documentation/hardware.htm, archived Oct. 13, 2005.
(Continued)

*Primary Examiner* — Erin Kryukova
(74) *Attorney, Agent, or Firm* — KLINTWORTH & ROZENBLAT IP LLP

(57) ABSTRACT

In some embodiments, optical systems with a reflector and a lens proximate a light output opening of the reflector provide light output with high spatial uniformity and high efficiency. The reflectors are shaped to provide substantially angularly uniform light output and the lens is configured to transform this angularly uniform light output into spatially uniform light output. The light output may be directed into a spatial light modulator, which modulates the light to project an image.

18 Claims, 31 Drawing Sheets

Related U.S. Application Data continuation of application No. 16/378,409, filed on Apr. 8, 2019, now Pat. No. 11,378,256, which is a continuation of application No. 15/442,451, filed on Feb. 24, 2017, now Pat. No. 10,306,213.

(60) Provisional application No. 62/300,742, filed on Feb. 26, 2016.

(51) Int. Cl.

| | |
|---|---|
| *G02B 6/12* | (2006.01) |
| *G02B 23/06* | (2006.01) |
| *G02B 27/01* | (2006.01) |
| *G02B 30/50* | (2020.01) |
| *H04N 13/315* | (2018.01) |
| *H04N 13/344* | (2018.01) |

(52) U.S. Cl.
CPC .. *G02B 6/0055* (2013.01); *G02B 2006/12102* (2013.01); *G02B 23/06* (2013.01); *G02B 2027/0134* (2013.01); *G02B 27/0172* (2013.01); *G02B 30/50* (2020.01); *G02F 2201/00* (2013.01); *H04N 13/315* (2018.05); *H04N 13/344* (2018.05)

(58) Field of Classification Search
CPC .... G02B 6/0036; G02B 6/0038; G02B 6/004; G02B 6/0041; G02B 6/0043; G02B 2006/12004; G02B 2006/1004; G02B 3/0006; G02B 3/0037; G02B 3/0043; G02B 3/005; G02B 3/0056; G02B 6/005; G02B 6/0055; G02B 2027/0134; G02B 30/50; G02B 2006/12102; G02B 23/06; F21V 13/04; F21V 13/045; F21V 5/007; F21V 5/04; F21V 7/0091; F21V 7/0083; F21V 7/048; F21V 7/09; H04N 9/3138; H04N 13/315; H04N 13/344; G03B 21/2013; G03B 21/208; G02F 2201/00
See application file for complete search history.

(56) References Cited

U.S. PATENT DOCUMENTS

| | | |
|---|---|---|
| 5,598,281 A | 1/1997 | Zimmerman et al. |
| 5,645,337 A | 7/1997 | Gleckman |
| 5,839,812 A | 11/1998 | Ge et al. |
| 5,900,982 A | 5/1999 | Dolgoff et al. |
| 6,163,391 A | 12/2000 | Curtis et al. |
| 6,320,182 B1 | 11/2001 | Hubble et al. |
| 6,850,221 B1 | 2/2005 | Tickle |
| D514,570 S | 2/2006 | Ohta |
| 7,283,706 B2 | 10/2007 | Kim et al. |
| 7,400,805 B2 | 7/2008 | Abu-Ageel |
| 7,758,185 B2 | 7/2010 | Lewis |
| 8,082,755 B2 | 12/2011 | Angel et al. |
| 8,199,388 B2 | 6/2012 | Chuang et al. |
| 8,353,594 B2 | 1/2013 | Lewis |
| 8,696,113 B2 | 4/2014 | Lewis |
| 8,733,927 B1 | 5/2014 | Lewis |
| 8,733,928 B1 | 5/2014 | Lewis |
| 8,950,867 B2 | 2/2015 | Macnamara |
| 9,010,929 B2 | 4/2015 | Lewis |
| 9,081,426 B2 | 7/2015 | Armstrong |
| 9,215,293 B2 | 12/2015 | Miller |
| 9,235,064 B2 | 1/2016 | Lewis |
| 9,239,473 B2 | 1/2016 | Lewis |
| 9,244,293 B2 | 1/2016 | Lewis |
| D752,529 S | 3/2016 | Loretan et al. |
| 9,310,559 B2 | 4/2016 | Macnamara |
| 9,348,143 B2 | 5/2016 | Gao et al. |
| D758,367 S | 6/2016 | Natsume |
| D759,657 S | 6/2016 | Kujawski et al. |
| 9,417,452 B2 | 8/2016 | Schowengerdt et al. |
| 9,470,906 B2 | 10/2016 | Kaji et al. |
| 9,547,174 B2 | 1/2017 | Gao et al. |
| 9,658,473 B2 | 5/2017 | Lewis |
| 9,671,566 B2 | 6/2017 | Abovitz et al. |
| D794,288 S | 8/2017 | Beers et al. |
| 9,740,006 B2 | 8/2017 | Gao |
| 9,791,700 B2 | 10/2017 | Schowengerdt |
| D805,734 S | 12/2017 | Fisher et al. |
| 9,841,601 B2 | 12/2017 | Schowengerdt |
| 9,851,563 B2 | 12/2017 | Gao et al. |
| 9,857,591 B2 | 1/2018 | Welch et al. |
| 9,874,749 B2 | 1/2018 | Bradski et al. |
| 10,151,937 B2 | 12/2018 | Lewis |
| 10,185,147 B2 | 1/2019 | Lewis |
| 10,306,213 B2 | 5/2019 | Sissom et al. |
| 11,378,256 B2 | 7/2022 | Sissom et al. |
| 11,692,689 B2 | 7/2023 | Sissom et al. |
| 2003/0076423 A1 | 4/2003 | Dolgoff |
| 2004/0264185 A1* | 12/2004 | Grotsch ............... H04N 9/3164 257/E33.071 |
| 2005/0036182 A1 | 2/2005 | Curtis et al. |
| 2005/0162750 A1 | 7/2005 | Kittelmann et al. |
| 2005/0174775 A1 | 8/2005 | Conner |
| 2006/0028436 A1 | 2/2006 | Armstrong |
| 2006/0238716 A1* | 10/2006 | Lee ................... G03B 21/2033 257/E33.073 |
| 2007/0081123 A1 | 4/2007 | Lewis |
| 2008/0158854 A1 | 7/2008 | Matsui |
| 2008/0239428 A1 | 10/2008 | Bell et al. |
| 2009/0051831 A1* | 2/2009 | Bierhuizen ......... G03B 21/208 349/5 |
| 2010/0226127 A1 | 9/2010 | Bigliatti et al. |
| 2011/0149592 A1 | 6/2011 | Artsyukhovich et al. |
| 2011/0242661 A1 | 10/2011 | Simmonds |
| 2012/0127062 A1 | 5/2012 | Bar-Zeev et al. |
| 2012/0162549 A1 | 6/2012 | Gao et al. |
| 2012/0224237 A1 | 9/2012 | Chuang et al. |
| 2013/0082922 A1 | 4/2013 | Miller |
| 2013/0092847 A1 | 4/2013 | Childers |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2013/0294045 A1 | 11/2013 | Morgenbrod |
| 2014/0064655 A1* | 3/2014 | Nguyen ............... G02B 6/0076 385/11 |
| 2014/0071539 A1 | 3/2014 | Gao |
| 2014/0131755 A1 | 5/2014 | Owen et al. |
| 2014/0140654 A1 | 5/2014 | Brown et al. |
| 2014/0177023 A1 | 6/2014 | Gao et al. |
| 2014/0204438 A1* | 7/2014 | Yamada ................. G02B 5/18 362/608 |
| 2014/0218468 A1 | 8/2014 | Gao et al. |
| 2014/0267420 A1 | 9/2014 | Schowengerdt et al. |
| 2014/0306866 A1 | 10/2014 | Miller et al. |
| 2015/0016777 A1 | 1/2015 | Abovitz et al. |
| 2015/0103306 A1 | 4/2015 | Kaji et al. |
| 2015/0168728 A1 | 6/2015 | Kobayashi |
| 2015/0178939 A1 | 6/2015 | Bradski et al. |
| 2015/0205126 A1* | 7/2015 | Schowengerdt ......... G06T 5/50 345/633 |
| 2015/0222883 A1 | 8/2015 | Welch |
| 2015/0222884 A1 | 8/2015 | Cheng |
| 2015/0268415 A1 | 9/2015 | Schowengerdt et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | Tekolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0041472 A1 | 2/2016 | Kawashima |
| 2016/0123560 A1 | 5/2016 | Catalano |
| 2017/0251201 A1 | 8/2017 | Sissom et al. |

(56) References Cited

U.S. PATENT DOCUMENTS

2019/0238826 A1   8/2019  Sissom et al.
2022/0333764 A1  10/2022  Sissom et al.

FOREIGN PATENT DOCUMENTS

| CN | 102705783 | A |   | 10/2012 |
|----|-----------|---|---|---------|
| JP | 2001311891 | A |   | 11/2001 |
| JP | 2006128562 | A |   | 5/2006 |
| JP | 2006283043 | A |   | 10/2006 |
| JP | 2006285043 | A | * | 10/2006 |
| JP | 2006524909 | A |   | 11/2006 |
| JP | 2007065080 | A | * | 3/2007 |
| JP | 2007288169 | A |   | 11/2007 |
| JP | 2008535032 | A |   | 8/2008 |
| JP | 2009186794 | A | * | 8/2009 |
| JP | 2010271554 | A |   | 12/2010 |
| JP | 2011060488 | A |   | 3/2011 |
| JP | 2012222304 | A |   | 11/2012 |
| JP | 2013097322 |   |   | 5/2013 |
| JP | 2014132328 | A |   | 7/2014 |
| JP | 2014142534 | A |   | 8/2014 |
| JP | 2015099238 | A |   | 5/2015 |
| JP | 2015118273 | A |   | 6/2015 |
| JP | 2015119236 | A |   | 6/2015 |
| WO | WO2004097946 | A2 |   | 11/2004 |
| WO | WO2008139355 | A1 |   | 11/2008 |
| WO | WO2017147520 | A1 |   | 8/2017 |

OTHER PUBLICATIONS

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Reality," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Davis, et al., "Fourier series analysis of fractal lenses: theory and experiments with a liquid-crystal display," Applied Optics, Vo. 45, No. 6, Feb. 20, 2006.

International Preliminary Report on Patentability for PCT Application No. PCT/US2017/019497, dated Aug. 28, 2018.

International Search Report and Written Opinion for PCT Application No. PCT/US2017/019497, dated May 8, 2017.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Jeffrey A. Davis et al.: "Fourier series analysis of fractal lenses: theory and experiments with a liquid-crystal display", Applied Optics, vol. 45, No. 6, pp. 1187-1192, (Feb. 20, 2006).

New Zealand Office Action (Further Exam Report) for NZ Application No. 745294, dated Aug. 16, 2019.

Partial Supplementary Search Report, re EP Application No. 17757373.0, dated Aug. 28, 2019.

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

Extended European Search Report issued in European Application No. 23188942.9 dated Oct. 16, 2023 [received Mar. 15, 2024] (12 pages).

* cited by examiner

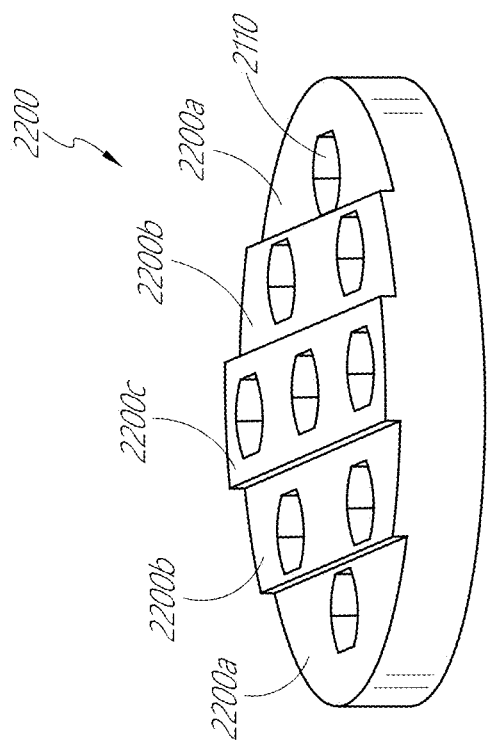
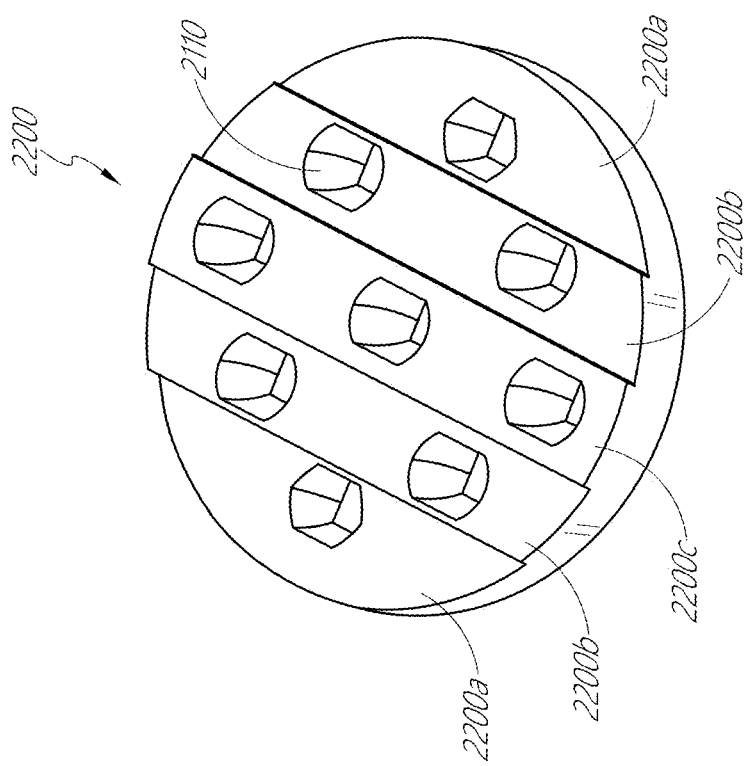
FIG. 20A
FIG. 20B

LIGHT OUTPUT SYSTEM WITH REFLECTOR AND LENS FOR HIGHLY SPATIALLY UNIFORM LIGHT OUTPUT

CROSS-REFERENCE TO RELATED APPLICATIONS

This application is a continuation of U.S. patent application Ser. No. 17/856,829, filed Jul. 1, 2022, entitled "LIGHT OUTPUT SYSTEM WITH REFLECTOR AND LENS FOR HIGHLY SPATIALLY UNIFORM LIGHT OUTPUT", which is a continuation of U.S. patent application Ser. No. 16/378,409, filed Apr. 8, 2019, entitled "LIGHT OUTPUT SYSTEM WITH REFLECTOR AND LENS FOR HIGHLY SPATIALLY UNIFORM LIGHT OUTPUT", which is a continuation of U.S. patent application Ser. No. 15/442,451, filed Feb. 24, 2017, entitled "LIGHT OUTPUT SYSTEM WITH REFLECTOR AND LENS FOR HIGHLY SPATIALLY UNIFORM LIGHT OUTPUT" (now U.S. patent Ser. No. 10/306,213), which claims the benefit of priority under 35 U.S.C. § 119(e) of U.S. Provisional Application No. 62/300,742, filed Feb. 26, 2016, entitled "LIGHT OUTPUT SYSTEM WITH REFLECTOR AND LENS FOR HIGHLY SPATIALLY UNIFORM LIGHT OUTPUT". The disclosures of these priority applications are hereby incorporated by reference in their entireties.

This application also incorporates by reference the entirety of each of the following patent applications: U.S. application Ser. No. 14/555,585 filed on Nov. 27, 2014; U.S. application Ser. No. 14/690,401 filed on Apr. 18, 2015; U.S. application Ser. No. 14/212,961 filed on Mar. 14, 2014; and U.S. application Ser. No. 14/331,218 filed on Jul. 14, 2014.

BACKGROUND

Field

The present disclosure relates to light output systems and, more particularly, to light output systems having reflectors and lens. In some embodiments, the light output systems may be part of augmented and virtual reality imaging and visualization systems.

Description of the Related Art

Imaging and visualization systems may utilize systems that output light into a light modulating device that then modulates and projects the light to form images in the eyes of a viewer. There is a continuing need to develop light projection systems that can meet the needs of modern imaging and visualization systems.

SUMMARY

In some embodiments, an optical system is provided. The optical system comprises a reflector, which comprises a light input opening, a light output opening, and reflective interior sidewalls extending between the light input opening and the light output opening. The optical system also comprises lens proximate a light output opening of the reflector. The sidewalls of the reflector may be shaped to provide substantially angularly uniform light output, and the lens may be configured to convert the substantially angularly uniform light output to substantially spatially uniform light output. In some embodiments, the reflector is one of an array of reflectors, each reflector having an associated lens forward of the output opening of the reflector.

The optical system may further comprise a light modulating device configured to receive light outputted by the reflector through the lens. The optical system may also further comprise a stack of waveguides, each waveguide comprising a light incoupling optical element configured to receive light from the light modulating device. The light incoupling optical element of each waveguide may be spatially offset from the light incoupling optical element of other waveguides, as seen along the axis of propagation of the light into the stack. The spatial arrangement of the reflectors, as seen in a plan view, may correspond and align one-to-one with a spatial arrangement of the light incoupling optical elements.

BRIEF DESCRIPTION OF THE DRAWINGS

FIGS. 20A-20b illustrate perspective views of examples of a body of material having reflectors with different heights.

Figure 1:
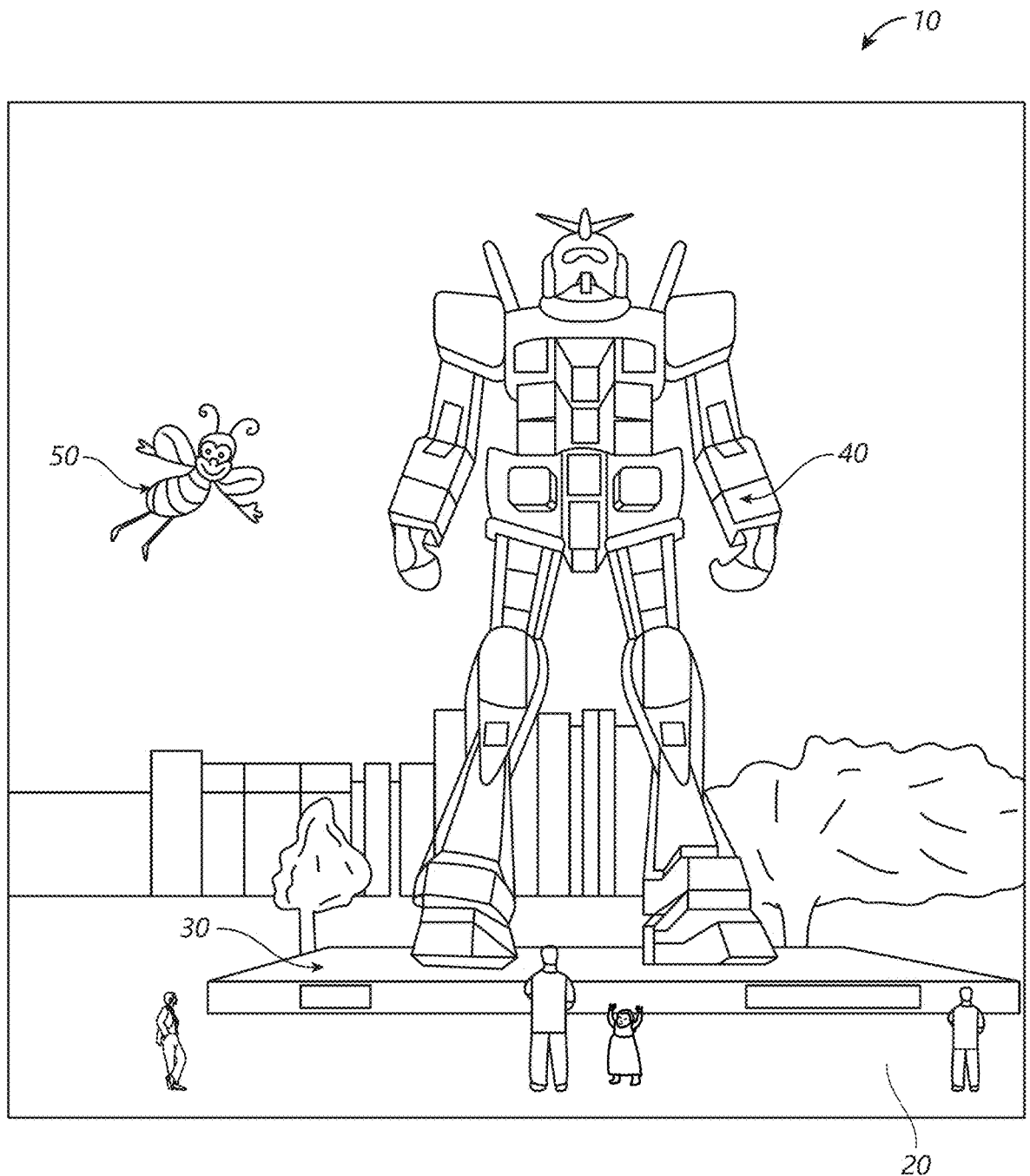
FIG. 1 illustrates a user's view of augmented reality (AR) through an AR device.

The drawings are provided to illustrate example embodiments and are not intended to limit the scope of the disclosure.

DETAILED DESCRIPTION

Display systems may form images by modulating light from a light emitter and then projecting that light for viewing by a viewer. Some imaging systems may utilize arrays of light emitters, each of which independently provide light to a light modulator. The light emitters present various challenges. For example, systems with arrays of light emitters may be complex, with multiple structures utilized to direct the propagation of light to the light modulator. Due to the complexity of the assembly, the systems may be difficult to manufacture.

In addition, it will be appreciated that the brightness uniformity of the images formed by the display system may be dependent upon the spatial uniformity of the light received by a light modulator from the light emitters. As a result, to display images with good brightness uniformity, it is desirable for the light received by the light modulator to be spatially uniform.

Advantageously, according to some embodiments, optical systems with a reflector and a lens proximate a light output opening of the reflector provide light output with high spatial uniformity and high efficiency. Preferably, the reflectors are shaped to provide substantially angularly uniform light output and the lens is configured to transform this angularly uniform light output into spatially uniform light output. The reflector has a light input opening for accommodating and/or receiving light from a light emitter and a light output opening for outputting that received light. In some embodiments, the light emitter emits light with a lambertian angular distribution. In some embodiments, the light emitter is an extended light source and may be, e.g., a light emitting diode. In some embodiments, the shapes of the light input and output openings may be different. In some embodiments, the lens is proximate (e.g., forward of) the light output opening of the reflector.

In some embodiments, the curvature of the interior reflective surfaces of the reflector, as seen in a cross-sectional side view, may follow the contours of an ellipse, hyperbola, or biconic shape. In some embodiments, the interior reflective surfaces of the reflector may have a generally linear profile as the reflector tapers from a relatively large light output opening to a smaller light input opening. Preferably, the reflective surface of the reflector is shaped to substantially collimate a set of edge rays corresponding to a design shape or sub-aperture fixed in the emitter surface. It will be appreciated that more than one set of edge rays may be included in the design of the reflector. For instance, a reflector designed to allow +/−50 microns of axial light emitter shift may be designed with several sets of edge rays that span this range, with the reflector shape chosen to substantially collimate each set. In some embodiments, the resulting shape of the reflective surface of the reflector may deviate slightly from an idealized off-axis parabolic section but is may be substantially similar to the shape of a compound parabolic concentrator (CPC). It will be appreciated that the shape and parameters for the lens and light emitter may be jointly chosen to achieve desired levels of spatially uniform light output and efficiency.

In some embodiments, the reflective interior surface of the reflector has the profile (as seem in a cross-sectional side view) of a compound parabolic concentrator (CPC), with this profile or curvature being present at least in cross-sections taken along two midplanes extending along the height axis of the reflector, with the midplanes being orthogonal to one another. It will be appreciated that the height of the reflector is the distance between the light input opening and the light output opening.

In some preferred embodiments, the interior surface of the reflector may have multiple sides and all of those sides may have a CPC profile, as seen in a side view. In addition, as seen in cross-sectional side views taken along planes transverse to the height axis of the reflector, all interior sidewalls may be linear or flat. Thus, the interior sidewalls may be considered to be facets and form corners at the intersections of these interior sidewalls. Preferably, these corners at intersections of the interior sidewalls are sharp corners due to the linear nature of the sidewalls, as noted above. In some embodiments, two opposing interior sidewalls may have a different CPC profile from other interior sidewalls. In some embodiments, all of those other interior sidewalls of the same CPC profile. In some other embodiments, at least two interior sidewalls, or all the interior sidewalls, are substantially linear extending from a light input end to a light output end of the reflector. Preferably, the total number of interior sidewalls is 6 or more, or, more preferably, 8 or more.

In some embodiments, a plurality of the reflectors and associated lenses form an array that provides discrete, spatially-separated sources of light output to, e.g., a light modulator. For example, a different light emitter may output light into each reflector and associated lens. In some embodiments, a mask may be provided forward of the lens, to provide light output with a desired crossectional shape. In some embodiments, at least some of the light emitters may emit light of different wavelengths than others of the light emitters. In some embodiments, at least some of the reflectors may have different heights than others of the reflectors. In some embodiments, the reflectors, lenses, and/or the mask may be formed in separate plates of material, which may later be assembled into a light output module.

It will be appreciated that CPC's are conventionally used to collect light, e.g., in solar energy collectors, or to output light in spotlighting applications. CPC's output light with good angular uniformity, but the light may form circular shapes with low light intensity at the interiors of the circular shapes, particularly where the CPC has a circular shape at its output opening. Such circular shapes are indicative of unacceptably spatially non-uniform light output, which has prevented the use of CPC's for providing light in imaging systems.

It has been found, however, that highly spatially uniform light output may be provided using a reflector having a profile that provides angularly uniform light output in conjunction with a lens. In some embodiments, the lens takes advantage of the highly angularly uniform light output of the reflector and performs a Fourier transform on this light, such that the light is converted into highly spatially uniform light after passing through the lens.

Advantageously, the high spatial uniformity allows the light output system to be utilized in various optical systems in which highly spatially uniform light output is desired. For example, the optical system may be a display system and the light output system may output light into a light modulating device for forming images. The light output system may also provide high efficiency, which can increase image brightness. For example, the shapes of the light input and output surfaces may be chosen to match, respectively, the shapes of the light emitter and the surface receiving the outputted light. This matching facilitates high efficiency, with an exceptionally high proportion of the light from the light emitter light reaching the receiving surface. In addition, the reflector may be formed in one or more unitary bodies of material, which can provide advantages for simplifying manufacturing and for providing a compact structure, while blocking light leakage between reflectors. In addition, other associated structures, such as mask openings, may also be formed in unitary bodies that may be overlaid the reflectors, which can simplify the manufacture of those structures, and the subsequent assembly of those structures into an integrated optical system. In some embodiments, the reflector and lens are configured to achieve 4-D light shaping.

Reference will now be made to the Figures, in which like reference numbers refer to like features throughout.

With reference to FIG. 1, an augmented reality scene 1 is depicted. Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world. FIG. 1 illustrates an augmented reality scene 1 in which the user of an AR technology sees a real-world park-like setting 20 featuring people, trees, buildings in the background, and a concrete platform 30. The user also perceives that he "sees" "virtual content" such as a robot statue 40 standing upon the real-world platform 1120, and a flying cartoon-like avatar character 50 which seems to be a personification of a bumble bee. These elements 50, 40 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

Figure 2:
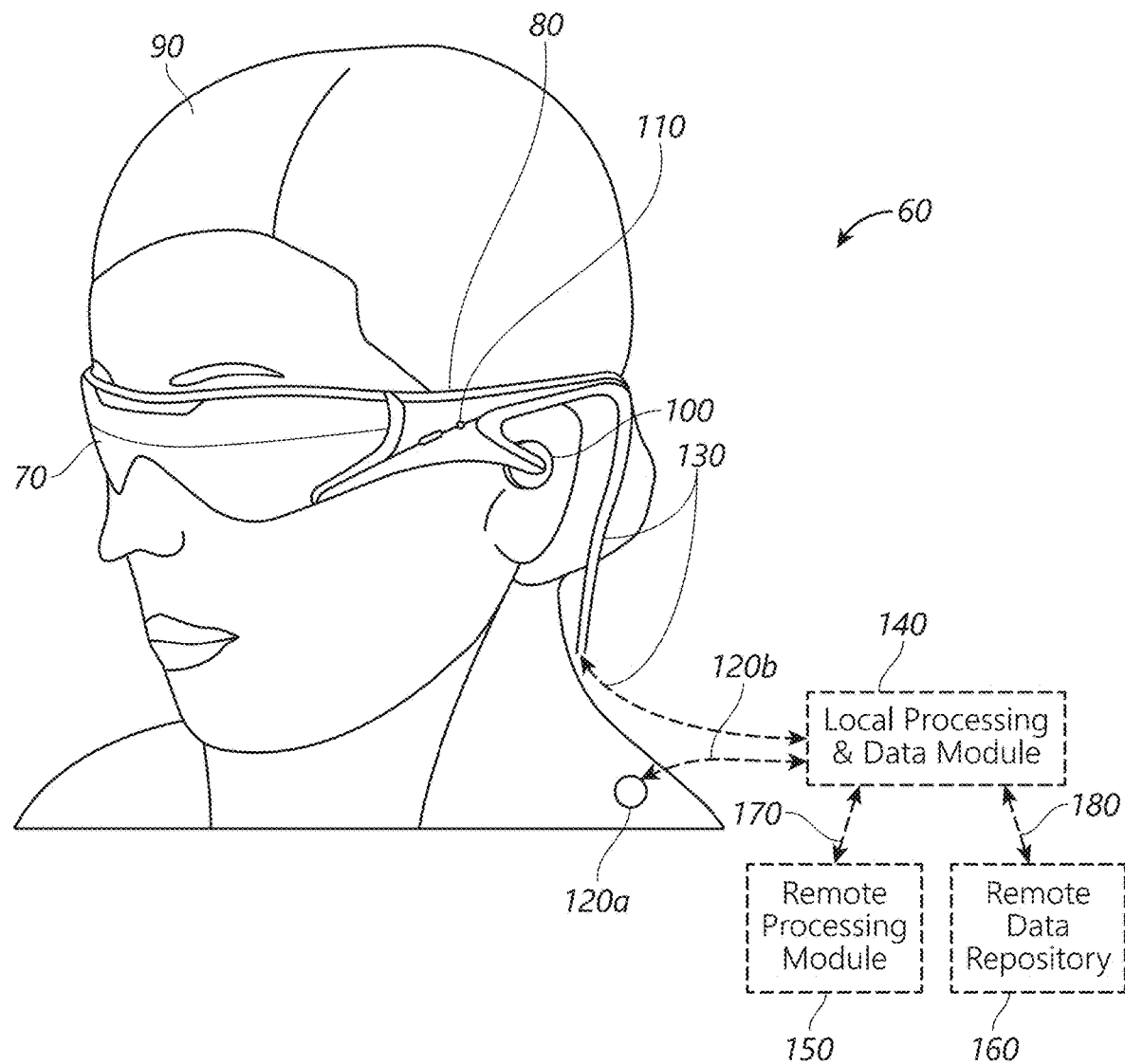
FIG. 2 illustrates an example of wearable display system.

FIG. 2 illustrates an example of wearable display system 60. The display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 2, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 2, in some embodiments, the remote processing module 150 may comprise one or more processors configured to analyze and process data and/or image information. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module.

Figure 3:
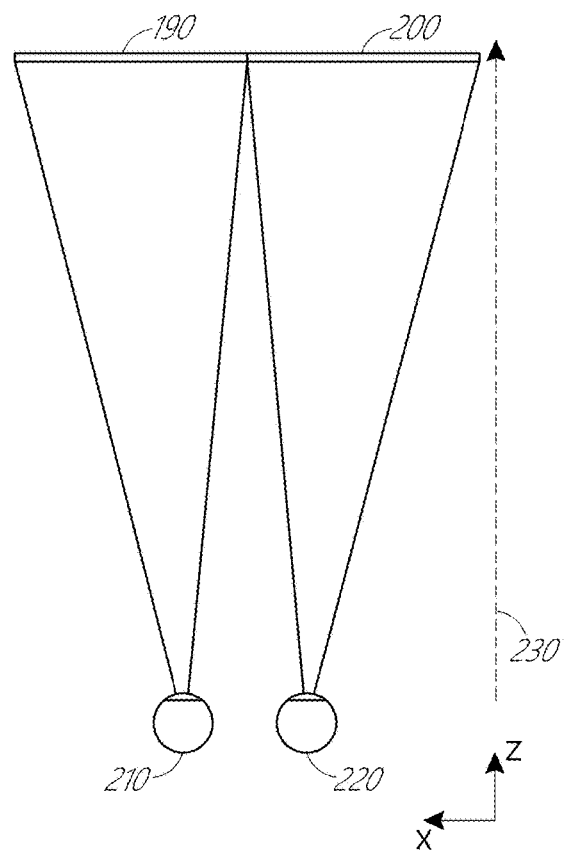
FIG. 3 illustrates a conventional display system for simulating three-dimensional imagery for a user.

With reference now to FIG. 3, the perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 190, 200—one for each eye 210, 220—are outputted to the user. The images 190, 200 are spaced from the eyes 210, 220 by a distance 230 along an optical or z-axis that is parallel to the line of sight of the viewer. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rotation of the eyes so that the pupils move toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, a change in vergence will trigger a matching change in accommodation of lens shape and pupil size, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide different presentations of a scene, but with the eyes viewing all the image information at a single accommodated state, and work against the "accommodation-vergence reflex." Display systems that provide a better match between accommodation and vergence may form more realistic and comfortable simulations of three-dimensional imagery.

Figure 4:
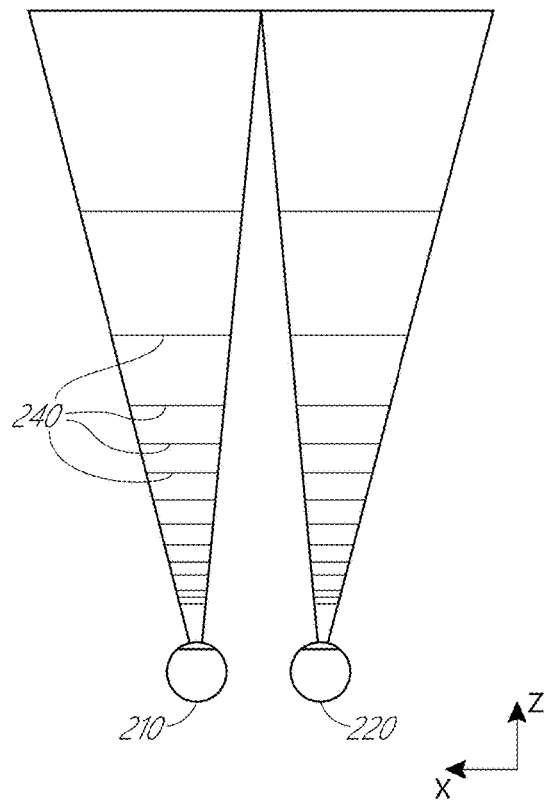
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4, objects at various distances from eyes 210, 220 on the z-axis are accommodated by the eyes 210, 220 so that those objects are in focus. The eyes 210, 220 assume particular accommodated states to bring into focus objects at different distances along the z-axis. Consequently, a particular accommodated state may be said to be associated with a particular one of depth planes 240, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 210, 220, and also by providing different presentations of the image corresponding to each of the depth planes. While shown as being separate for clarity of illustration, it will be appreciated that the fields of view of the eyes 210, 220 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state.

Figure 5A:
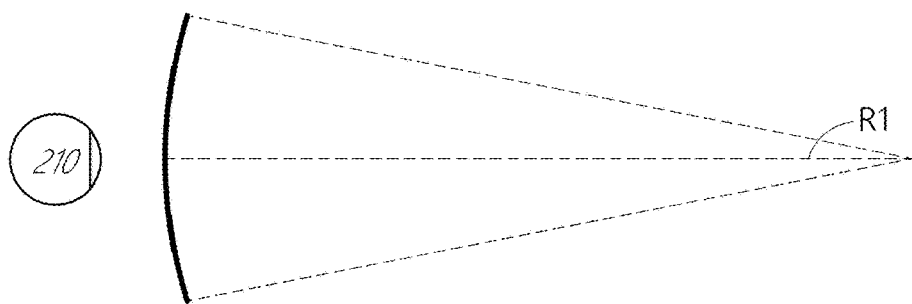
FIGS. 5A-5C illustrate relationships between radius of curvature and focal radius.
Figure 5B:
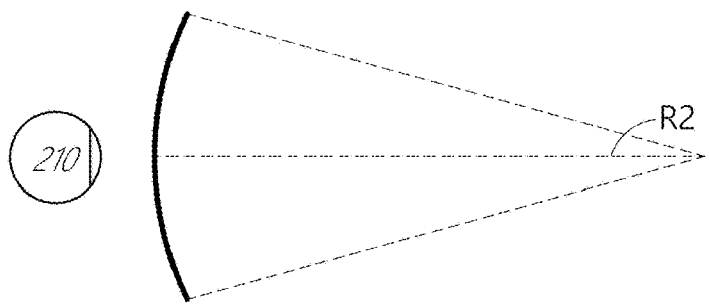
Figure 5C:
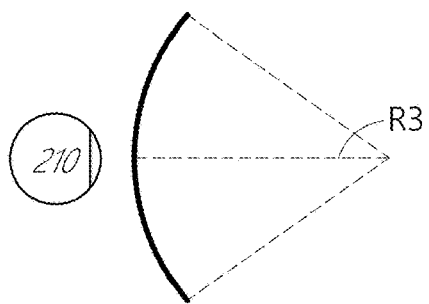

The distance between an object and the eye 210 or 220 may also change the amount of divergence of light from that object, as viewed by that eye. FIGS. 5A-5C illustrate relationships between distance and the divergence of light rays. The distance between the object and the eye 210 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. Consequently, at different depth planes, the degree of divergence of light rays is also different, with the degree of divergence increasing with decreasing distance between depth planes and the viewer's eye 210. While only a single eye 210 is illustrated for clarity of illustration in FIGS. 5A-5C and other figures herein, it will be appreciated that the discussions regarding eye 210 may be applied to both eyes 210 and 220 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
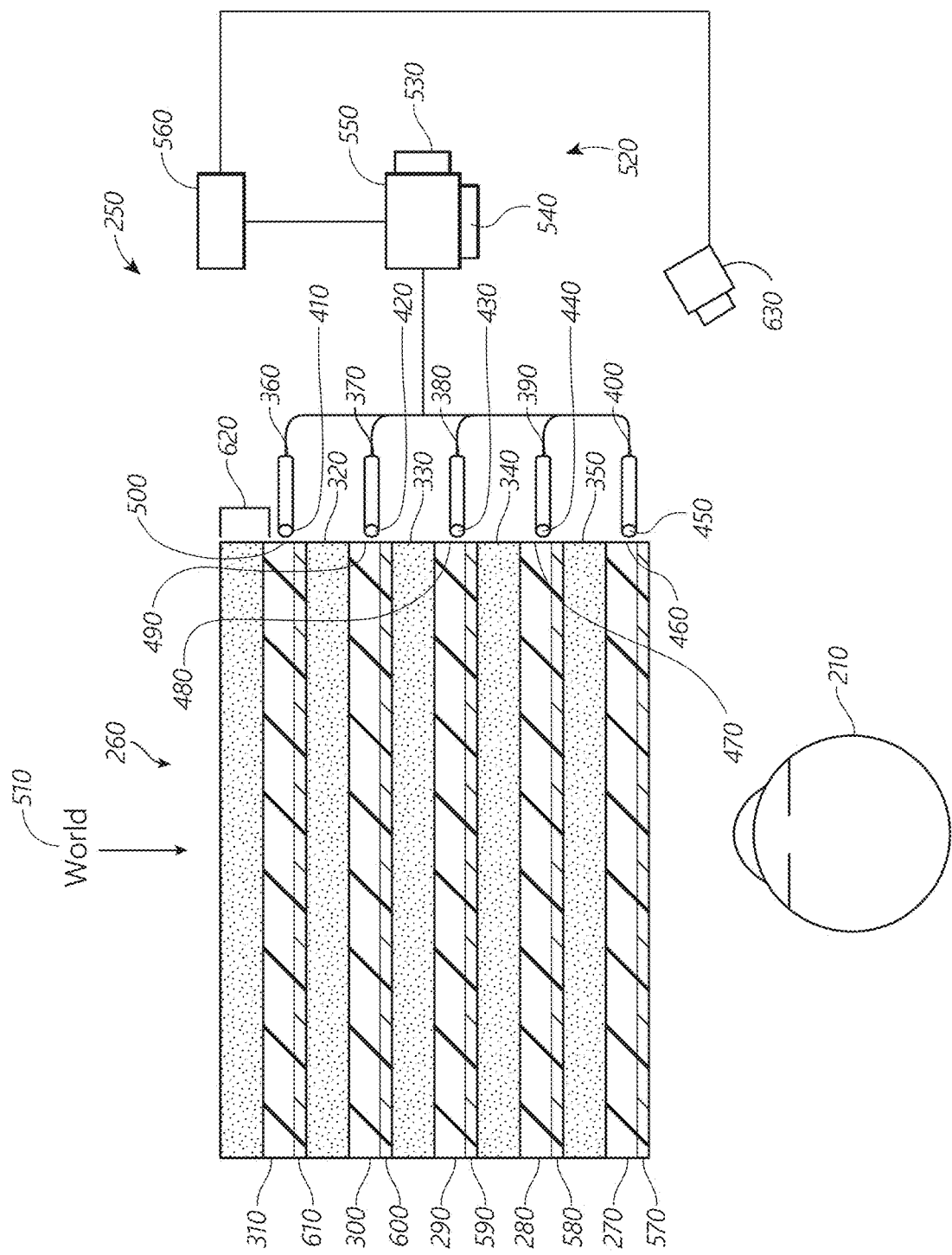
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. In some embodiments, the display system 250 is the system 60 of FIG. 2, with FIG. 6 schematically showing some parts of that system 60 in greater detail. For example, the waveguide assembly 260 may be part of the display 70 of FIG. 2. It will be appreciated that the display system 250 may be considered a light field display in some embodiments. In addition, the waveguide assembly 260 may also be referred to as an eyepiece.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, the each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 540, which may include a light emitter, such as a light emitting diode (LED). The light from the light module 540 may be directed to and modified by a light modulator 530, e.g., a spatial light modulator, via a beam splitter 550. The light modulator 530 may be configured to change the perceived intensity of the light injected into the waveguides 270, 280, 290, 300, 310. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 540 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 540, and the light modulator 530. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 2) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it can reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This can provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 2) and may be in electrical communication with the processing modules 140 and/or 150, which may process image information from the camera assembly 630. In some embodiments, one camera assembly 630 may be utilized for each eye, to separately monitor each eye.

Figure 7:
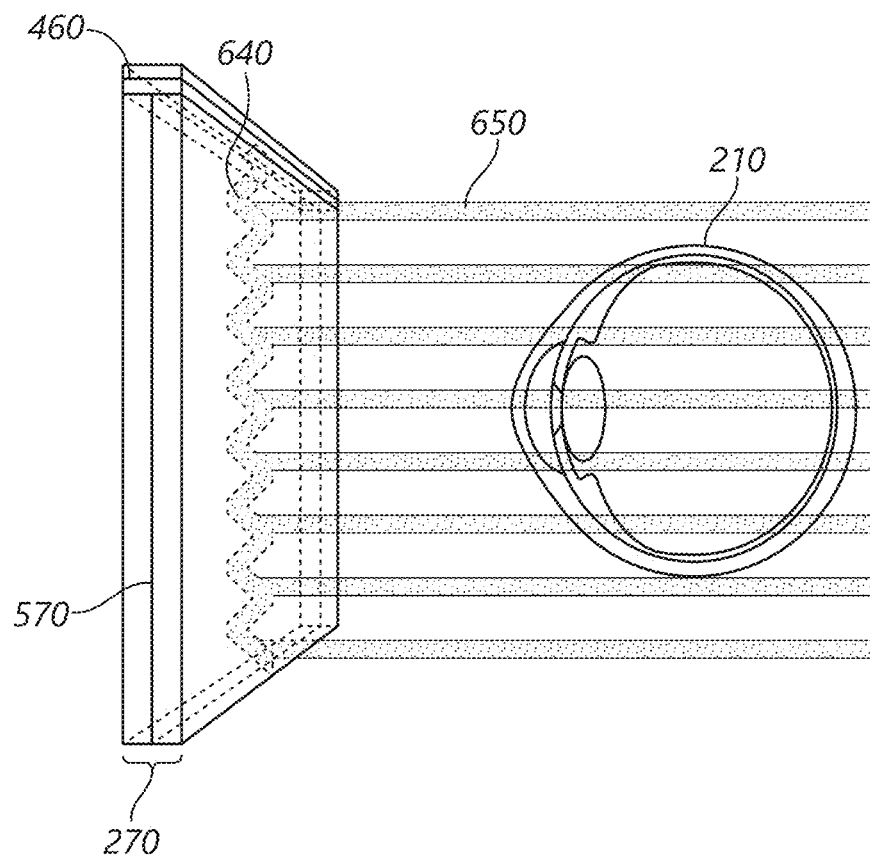
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
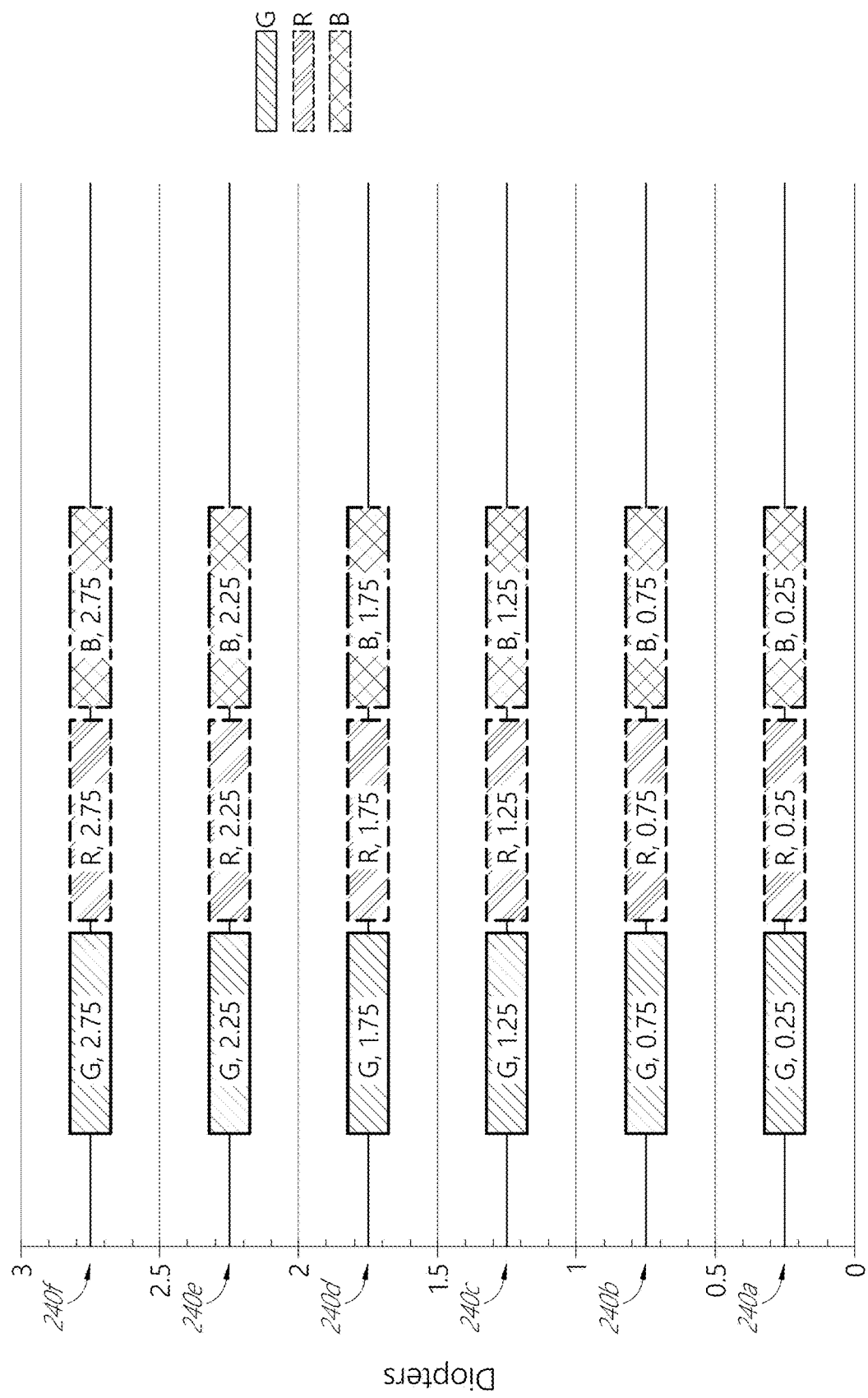
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 540 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
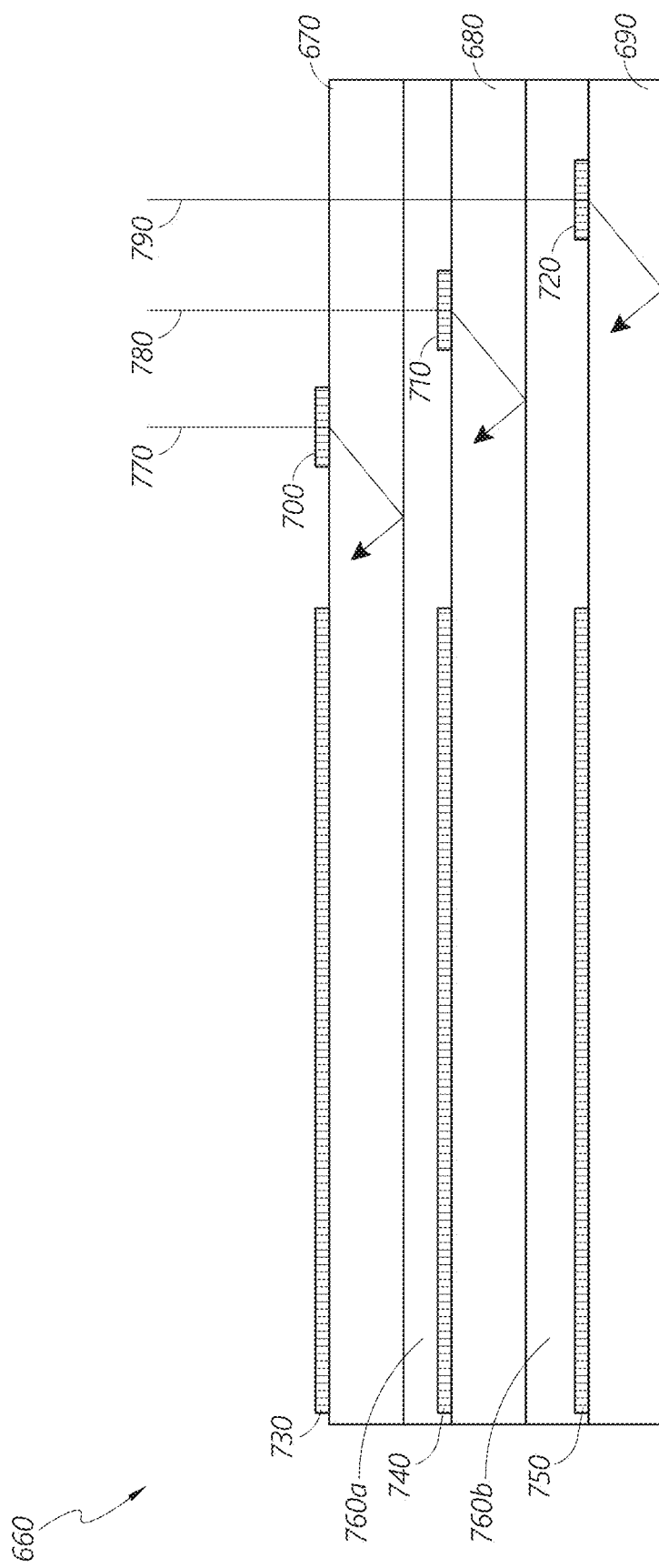
FIG. 9A illustrates a cross-sectional side view of an example of a set of stacked waveguides that each includes an incoupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
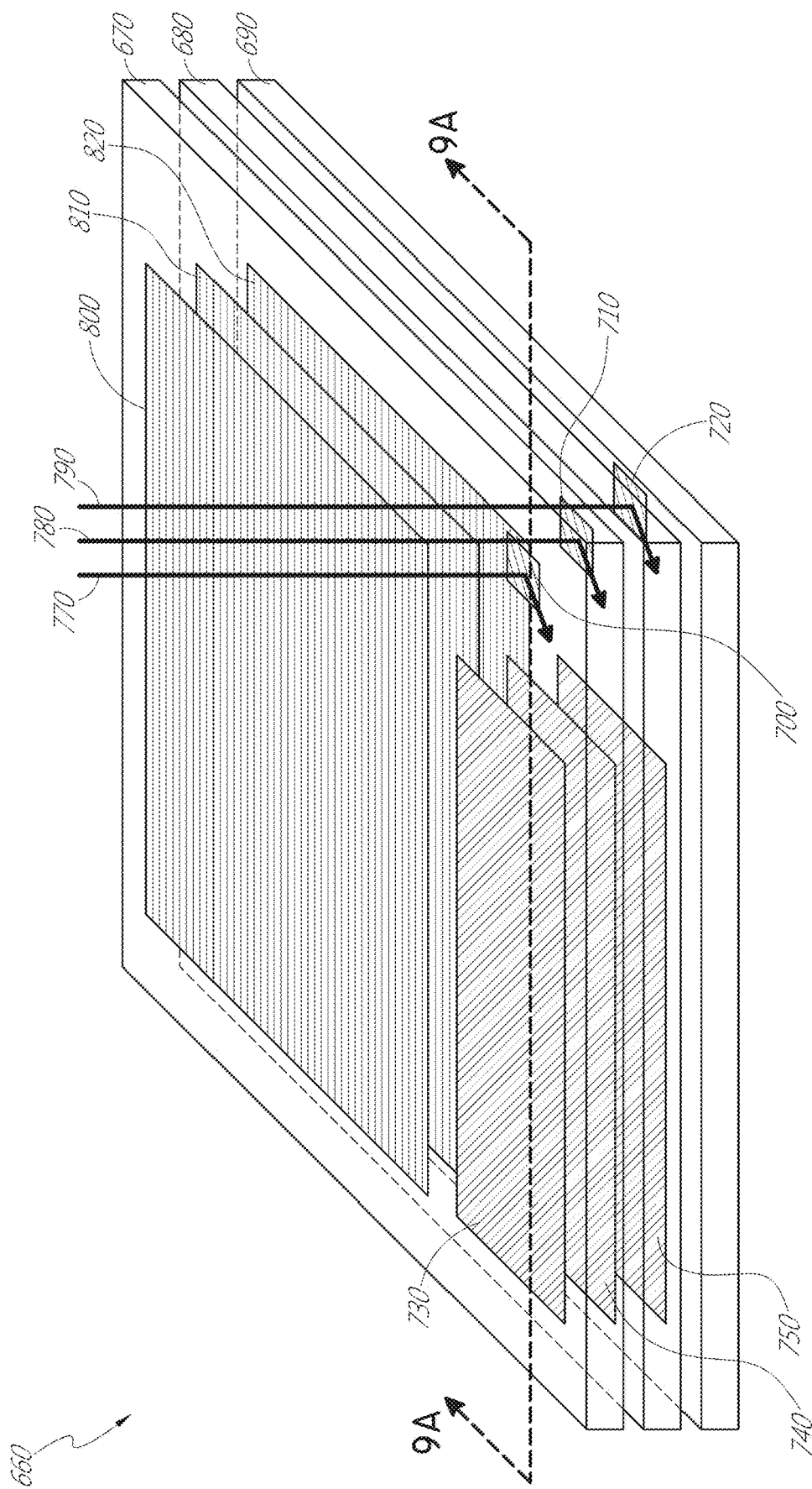
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
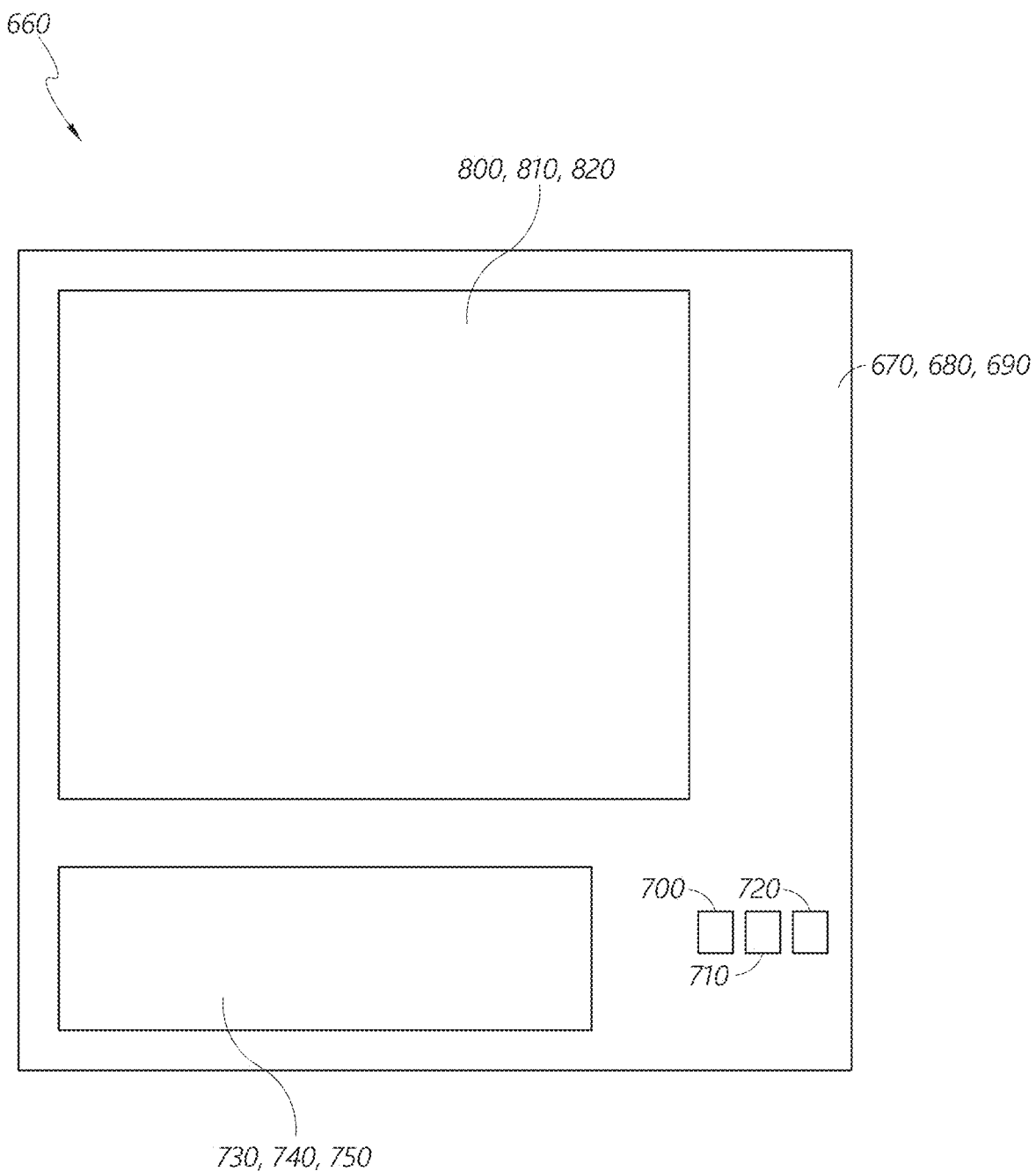
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Figure 10:
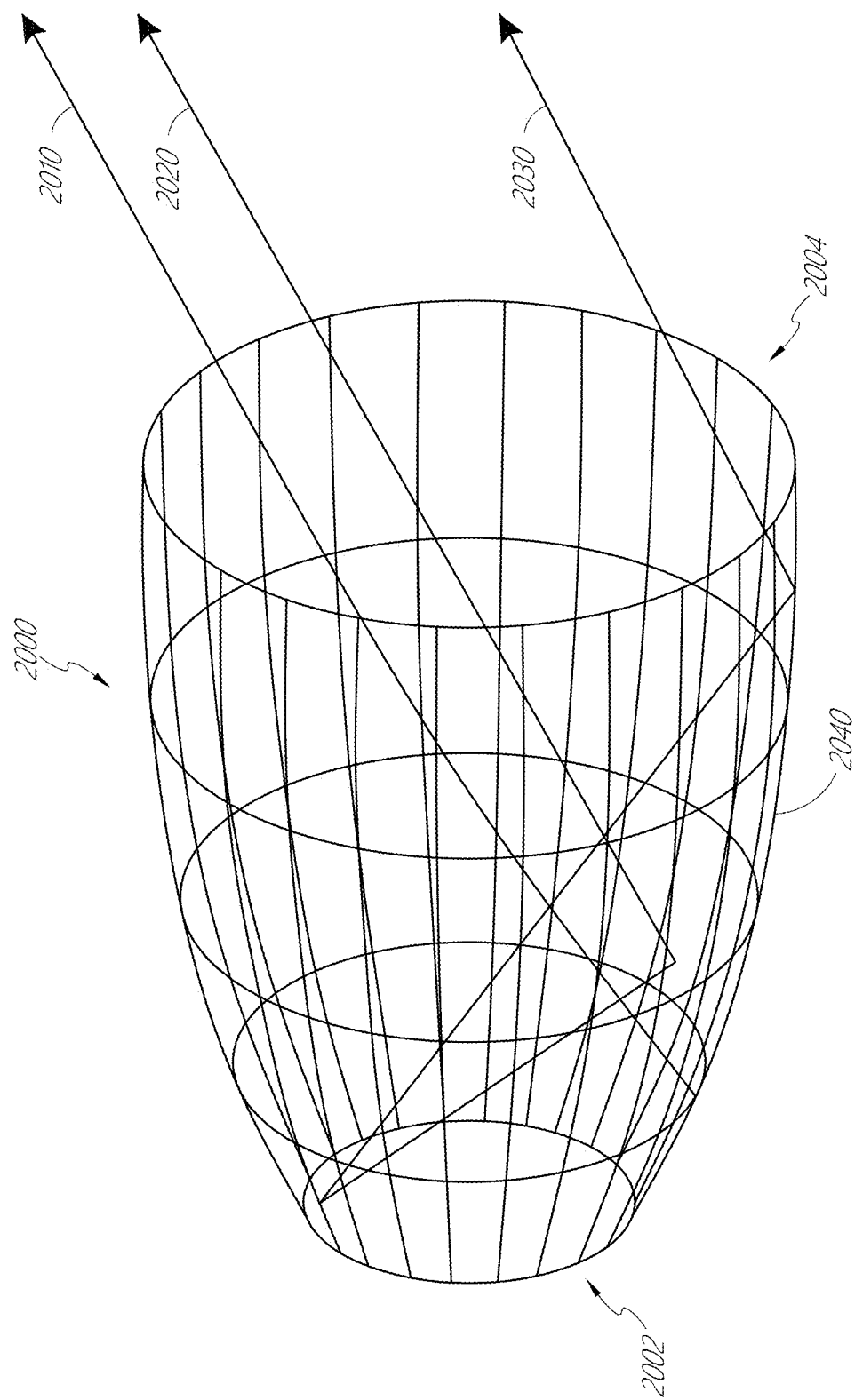
FIG. 10 illustrates an example of a reflector having the profile of a compound parabolic concentrator (CPC).

In some embodiments, light from a light emitter is shaped using a reflector and lens. FIG. 10 illustrates an example of a reflector 2000 having the profile of a compound parabolic concentrator (CPC). The reflector 2000 has a light input opening 2002 and a light output opening 2004, both of which may be circular. The light input opening may receive light (e.g., light rays 2010, 2020, 2030) from a light emitter (not shown). The light reflects off the walls 2040 of the reflector to exit the reflector 2000 through the light output opening 2004. Notably, the outputted light rays 2010, 2020, 2030 have a high degree of angular uniformity and may exit the reflector substantially parallel to one another. Thus, edge rays are collimated by the CPC. The spatial uniformity of the outputted light is poor, however. Undesirably, the light exiting the reflector 2010 may form hot spots in the shape of a ring.

Figure 11:
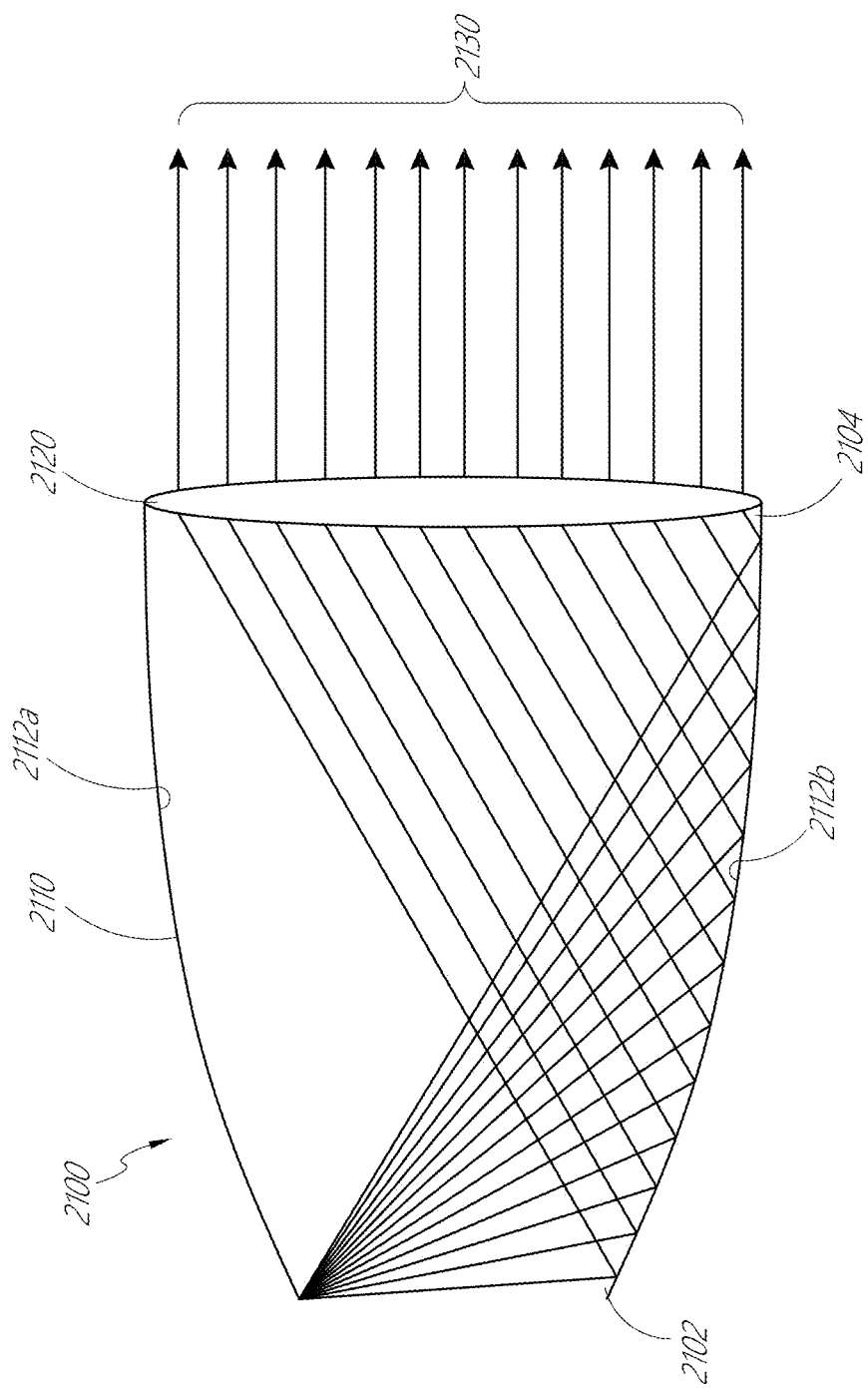
FIG. 11 illustrates an example of an optical system having a reflector and a lens.
Figure 12:
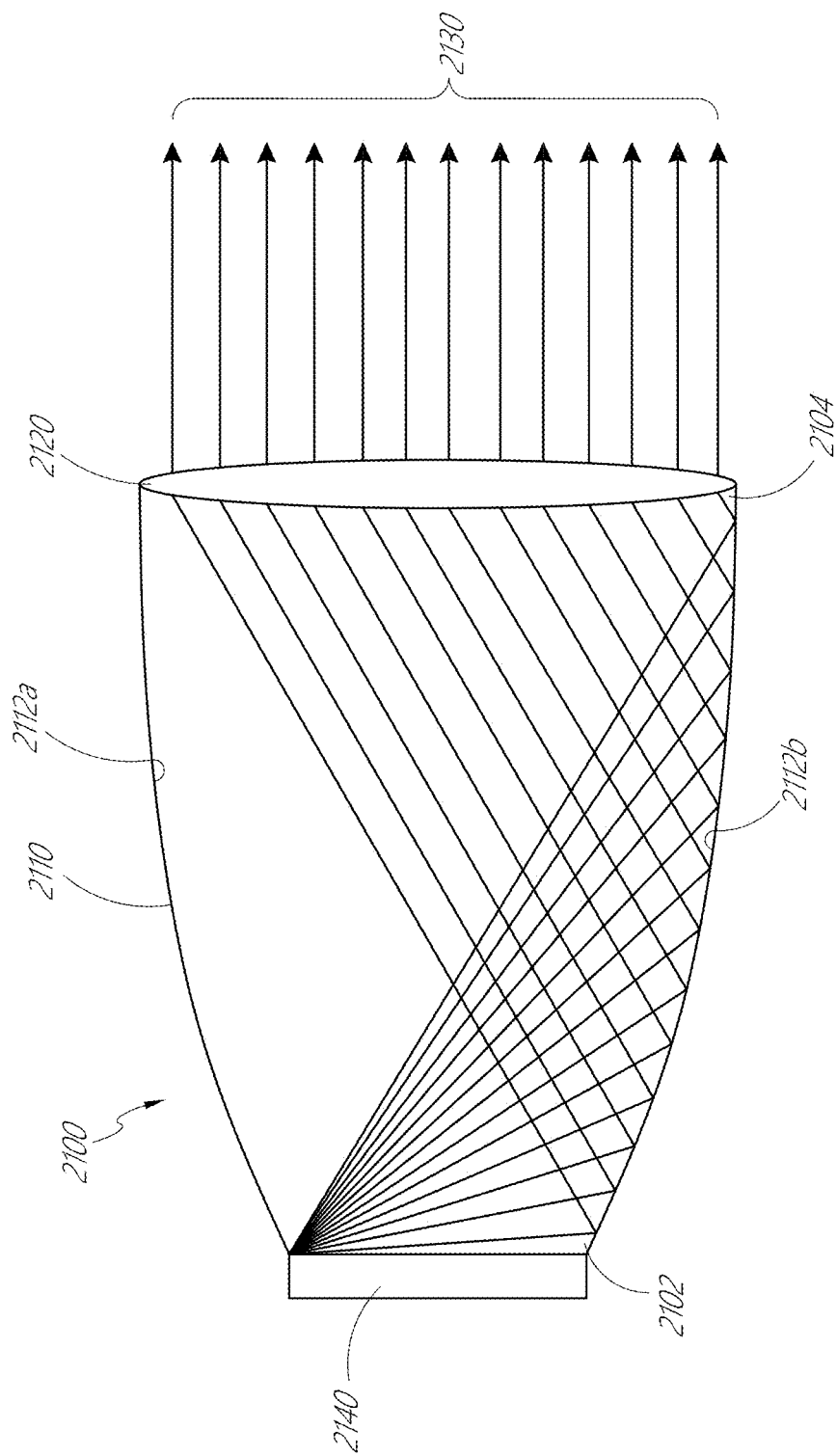
FIG. 12 illustrates an example of an optical system having a light emitter, a reflector, and a lens.

With reference to FIGS. 11-12, a lens (e.g., a Fourier transform lens) may be utilized to transform the angularly uniform light output of a reflector into spatially uniform light output. FIG. 11 illustrates an example of an optical system 2100 having a reflector 2110 and a lens 2120. The reflector 2110 has a light input opening 2102 and a light output opening 2104, with interior sidewalls 2112a, 2112b that extend from the light input opening 2102 and to the light output opening 2104. The interior sidewalls 2112a, 2112b are curved to provide angularly uniform light output to the lens 2120. In some embodiments, the sidewalls 2112a, 2112b have a CPC profile; that is, the curvature of the interior sidewalls 2112a, 2112b follows that of a compound parabolic concentrator. It will be appreciated that, in some embodiments, the interior sidewalls 2112a, 2112b may follow the contours of an ellipse, hyperbola, or biconic shape. In some other embodiments, the interior sidewalls 2112a, 2112b may be substantially linear, which has been found to provide sufficiently angularly uniform light output for the lens 21020 to output highly spatially-uniform light. It will be appreciated that the sidewalls 2112a, 2112b are shown as separate in the illustrated cross-section, but, in an actual three-dimensional reflector, 2112a and 2112b are simply opposing sides of a continuous surface. Preferably, the sidewalls 2112a, 2112b are specular reflectors. In some embodiments, the sidewalls 2112a, 2112b may be formed of a reflective material and/or may be lined with a reflective material.

FIG. 12 illustrates an example of the optical system 2100 having a light emitter 2140 is positioned to emit light into the reflector 2110. In some embodiments, the light emitter 2140 is outside of the light input opening. In some other embodiments, the light emitter 2140 is positioned inside of the interior volume of the reflector 2110. In some embodiments, the light emitter 2140 has a lambertian radiation pattern. The light emitter 2140 may be, for example, a light emitting diode (LED), an incandescent light bulb, a fluorescent light bulb, or other device that, e.g., converts electrical energy into light.

With continued reference to FIGS. 11 and 12, the lens 2120 is proximate the light output opening 2104. In some embodiments, the lens 2120 is located forward or directly at the light output opening 2104. In some other embodiments, the lens 2120 may be located inside the reflector 2110. Preferably, the distance from the lens 2120 to the light emitter 2140 is substantially equal to the focal length of the lens. In addition, the distance from the lens to a light modulator (not shown) is preferably also substantially equal to the focal length of the lens.

It will be appreciated that the illustration of the lens 2120 is schematic. It will also be appreciated that the lens 2120 is an optical transmissive structure configured to transform the angularly uniform light output of the reflector 2110 into spatially uniform light output. For example, as illustrated, light rays 2130 emitted by the light emitter 2140 are reflected off the sidewalls 2112a, 2112b such that they propagate in substantially the same direction. The lens 2120 then transforms this angularly uniform output into the spatially uniform light 2130 propagating away from the lens 2120. The lens may be a singlet lens in some embodiments. In some other embodiments, the lens 2120 may be a compound lens, such as a doublet lens, or a system of lens. Preferably, the lens 2120 extends across substantially the entirety of the area of the light output opening 2104.

Figure 13:
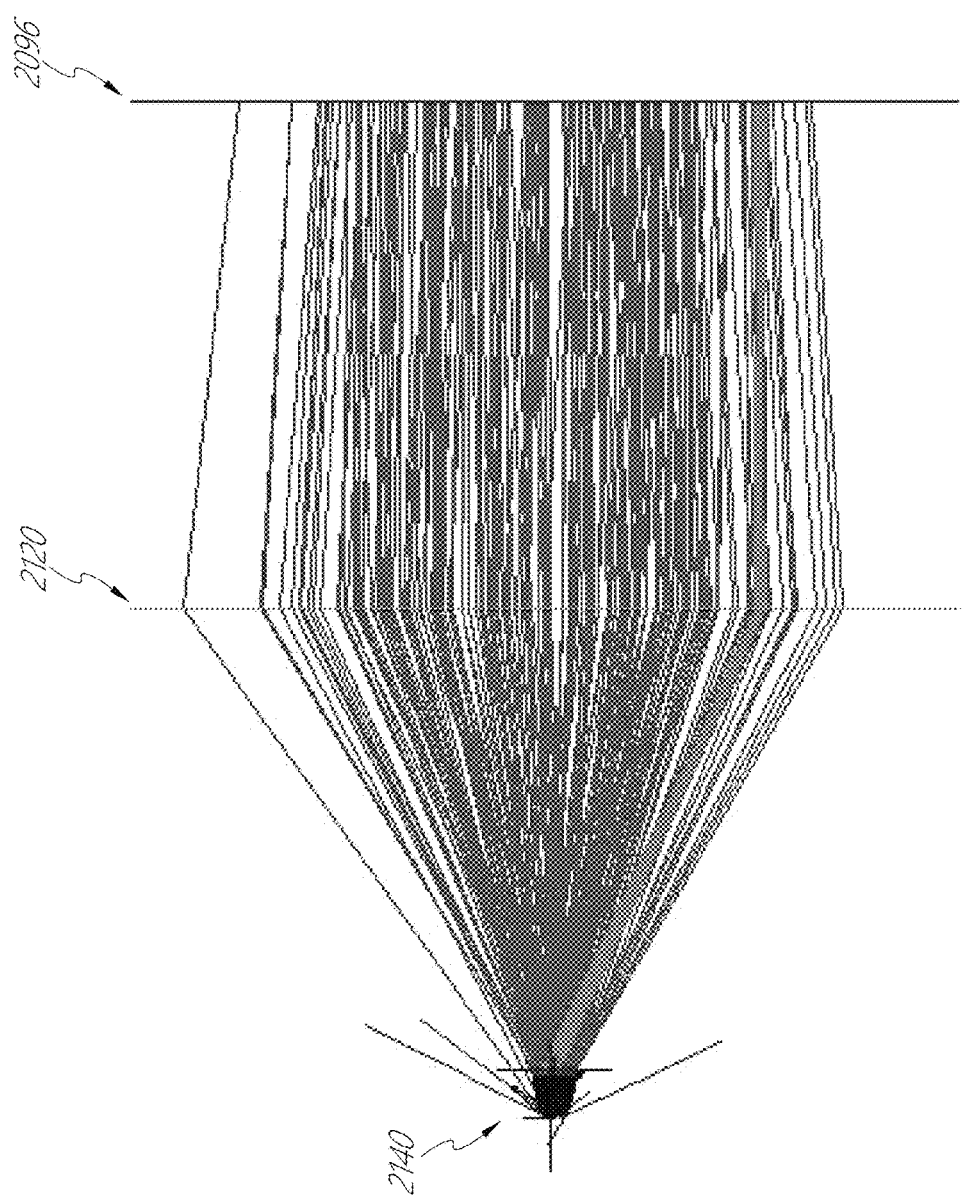
FIG. 13 illustrates an example of the light output from the optical system of FIGS. 11-12.

FIG. 13 illustrates an example of the light output from the optical system 2100 of FIGS. 11-12. Light propagates away from the light emitter 2140 into the lens 2120, and then from the lens 2120 to the light modulator 209b. The lens 2120 and the light modulator 209b are represented schematically as lines in this figure. As noted herein, the distance between the light emitter 2140 and the lens 2120 may be equal to the focal length of the lens, and the distance between the lens 2120 and the light modulator 209b may also be equal to the focal length of the lens.

In some embodiments, the reflector 2110 has a light input opening and a light output opening that are the same shape, e.g., circular. In some other embodiments, the shapes of the light input opening and the light output opening are different. FIGS. 14A-14F illustrate examples of reflectors having light input openings and light output openings with different shapes. The ability to vary the shapes of the light input and output openings can provide advantages for efficiently matching light emitters and light modulators having different shapes or aspect ratios.

Figure 14A:
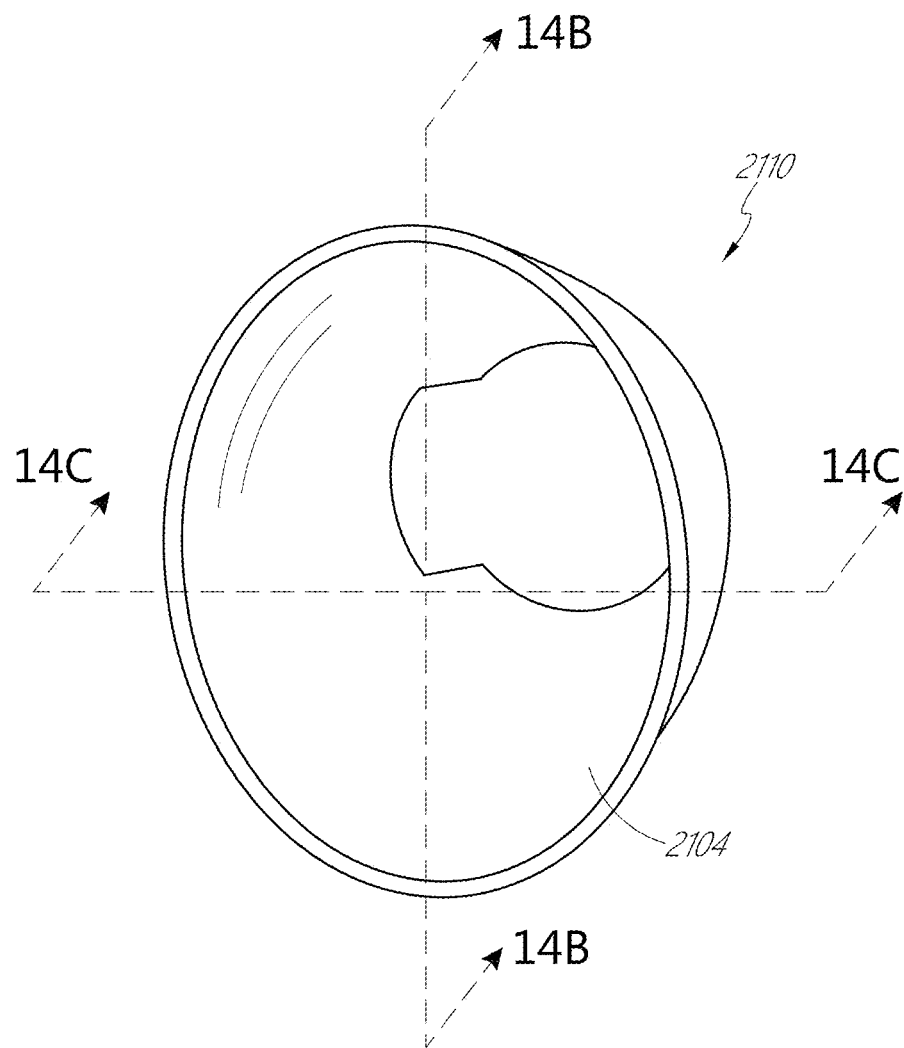
FIGS. 14A-14F illustrate examples of reflectors having light input openings and light output openings with different shapes.
Figure 14C:
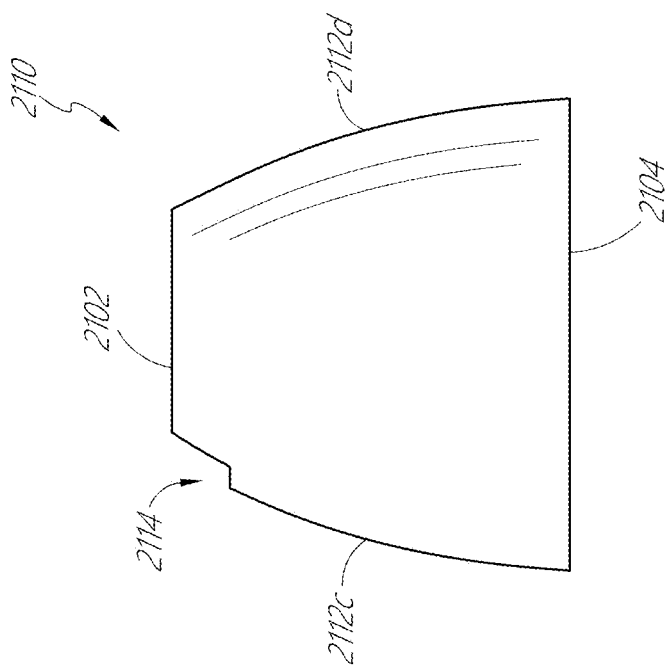
Figure 14B:
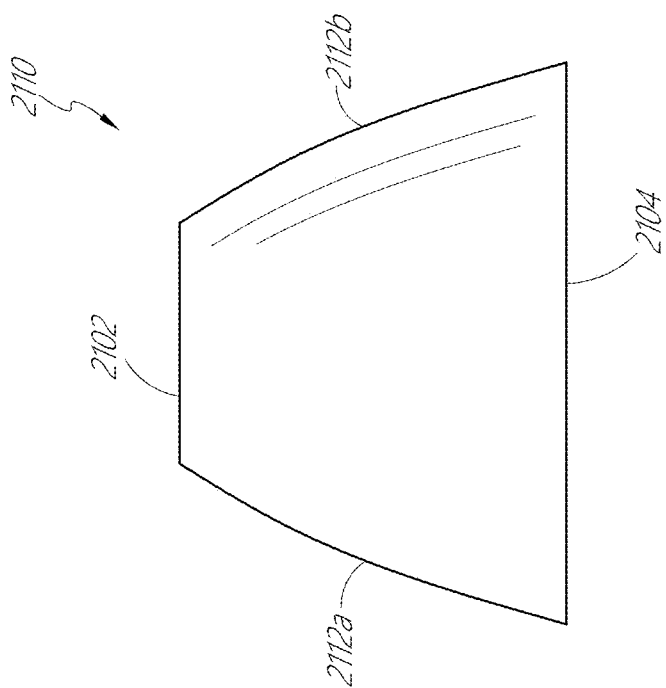

FIGS. 14A-14C illustrate the reflector 2110 with a progressive elliptical shape. FIG. 14A is a perspective view with the light output opening 2104 facing the viewer. FIG. 14B is a side view looking directly at the plane 14B of FIG. 14A. FIG. 14C is another side view, this time looking directly at the plane 14C of FIG. 14A. The plane 14B is orthogonal to the plane 14C. As illustrated, in some embodiments, the light input opening 2102 of the reflector 2110 has a circular shape, which progressively expands at different rates as seem along the planes 14A and 14B, such that the light output opening 2104 has an elliptical shape. For example, the sidewalls 2112a and 2112b expand out at a greater rate than the sidewalls 2112c and 2112d. In some embodiments, a notch 2114 may be present at the light input opening 2102 and extend into the sidewall 2112c. The notch 2114 may allow connectors (e.g., wire bonds) for a light emitter (e.g., light emitter 2140, FIG. 12) to be accommodated.

Figure 14D:
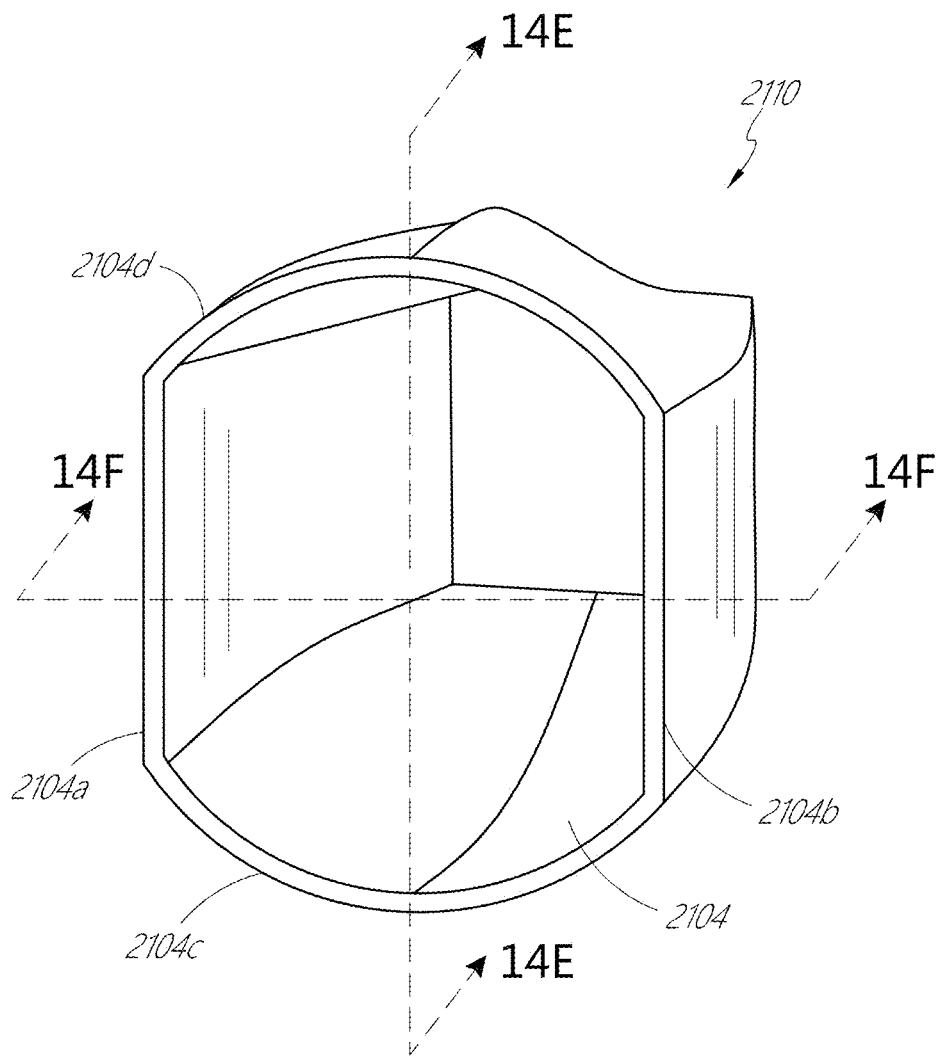
Figure 14F:
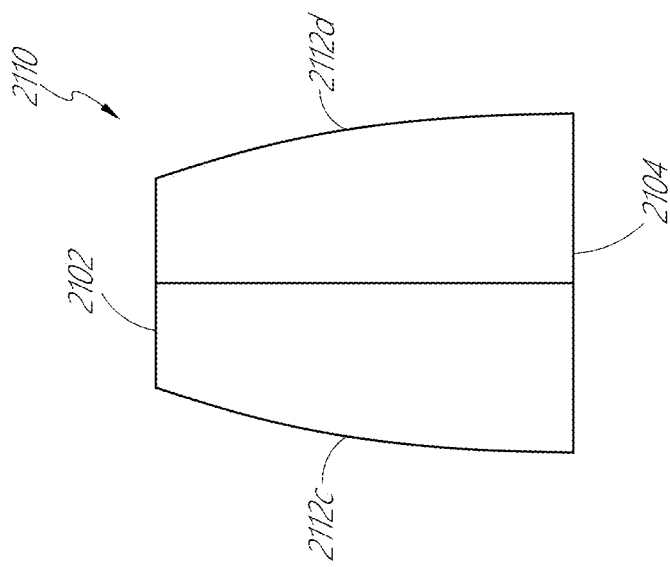
Figure 14E:
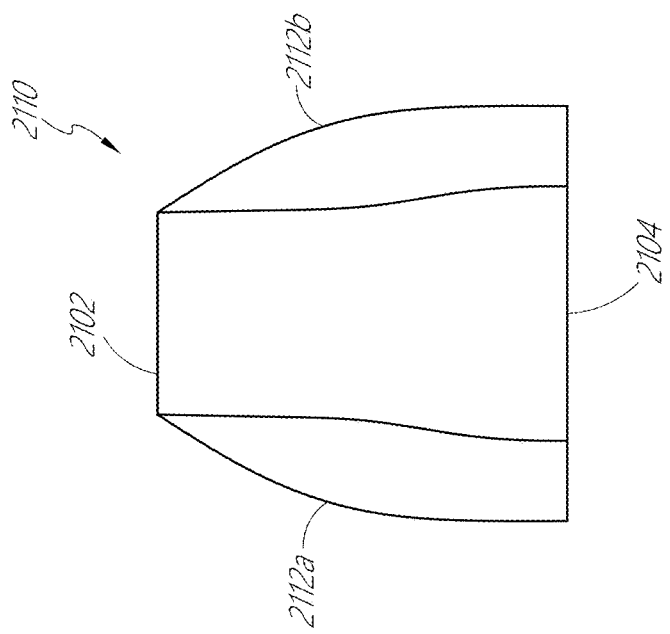

FIGS. 14D-14F illustrate the reflector 2110 with a rectangular light input opening 2102. FIG. 14D is a perspective view with the light output opening 2104 facing the viewer. FIG. 14E is a side view looking directly at the plane 14E of FIG. 14D. FIG. 14F is another side view, this time looking directly at the plane 14F of FIG. 14D. The plane 14E is orthogonal to the plane 14F. As illustrated, in some embodiments, the light input opening 2102 of the reflector 2110 has a rectangular shape (e.g., a square shape), which progressively expands such that the light output opening 2104 has a rectangular shape with different lengths and widths. It will be appreciated that a square light input opening 2102 may be beneficial for mating to a square light emitter, such as many LED's. On the other hand, in applications where the reflector 2110 is used to provide light to a light modulator 209b (FIG. 6), the light modulator 209b may be configured to generate images at standard aspect ratios, in which one dimension is larger than another crossing dimension (e.g., the aspect ratios may be 4:3, 16:9, etc.). As illustrated in FIG. 14D, the light output opening 2104 may have two straight sides 2104a, 2104b joined by two curves sides 2104c, 2104d.

With reference to FIGS. 14A-14F, the planes 14A, 14B, 14E, and 14F, are midplanes that substantially bisect (at least with reference to the light output opening 2104) the various illustrated embodiments of the reflector 2110. It will be appreciated that the distance from the light output opening 2104 to the light input opening 2102 may be considered to be the height of the reflector 2110 and the planes 14A, 14B, 14E, and 14F may be considered to each have an axis extending along the height axis of the reflector 2110. In addition, the pairs of midplanes 14A and 14B, and 14E and 14F, are orthogonal to one another. Preferably, as seem in the midplanes 14A, 14B, 14E, and 14F, the interior sidewalls 2112a, 2112b, 2112c, 2112d each follow a CPC profile and have the curvature of a compound parabolic concentrator.

Figure 15A:
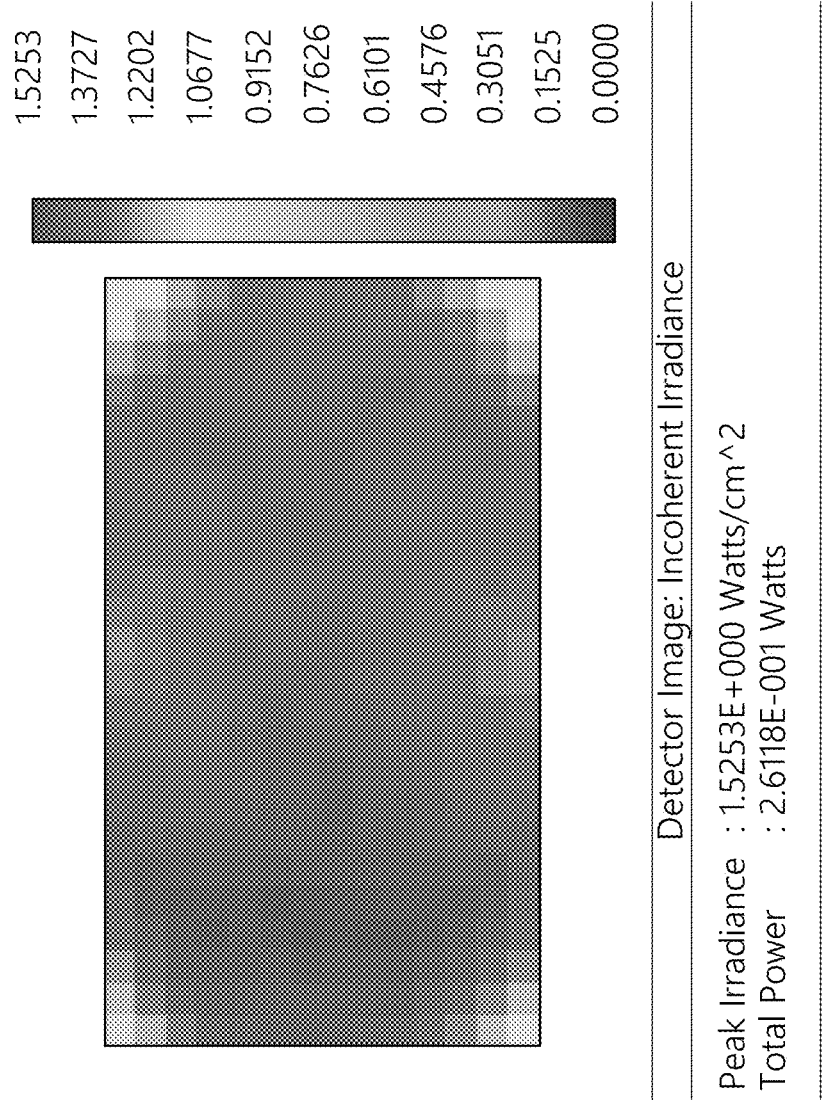
FIGS. 15A and 15B illustrate examples of uniformity maps for the light output of the reflectors of FIGS. 14A-14C and 14D-14F, respectively.
Figure 15B:
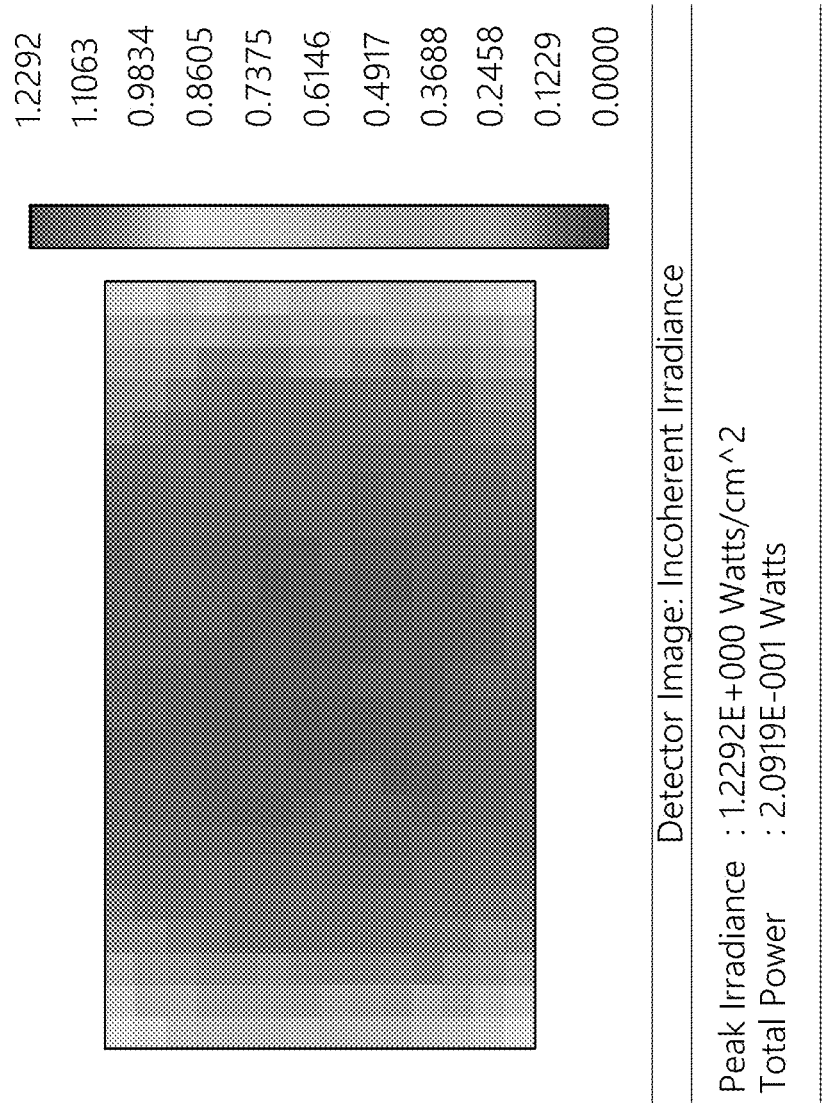

The optical system comprising the reflectors and lens provides exceptional spatially uniform light output. FIGS. 15A and 15B illustrate examples of uniformity maps for the light output of the reflectors of FIGS. 14A-14C and 14D-14F, respectively. In these maps, different colors indicate different light intensity. Advantageously, as illustrated, the colors and intensities are highly uniform, indicating high spatial uniformity.

Figure 16:
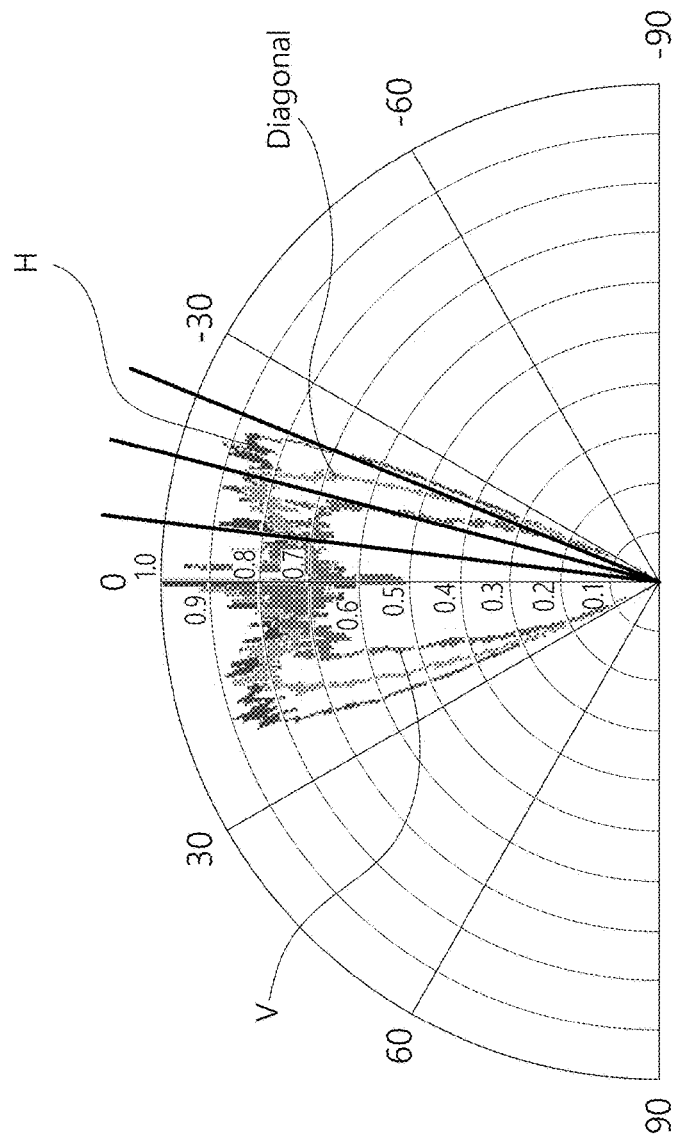
FIG. 16 illustrates an example of a map showing the intensity of light output, in angle space, for the reflector of FIGS. 14A-14C in conjunction with a lens.

The light output also has good angular uniformity. FIG. 16 illustrates an example of a map showing the intensity of light output, in angle space, for the reflector of FIGS. 14A-14C in conjunction with a lens according to embodiments herein. V corresponds to the angular spread of light output along the major (longer) axis of the light output opening 2104 (FIG. 14A), H corresponds to the angular spread of light output along the minor (short) axis of the light output opening 2104, and Diagonal corresponds to the angular spread of light output along the diagonal of the light output opening. Notably, the cutoff for each of V, H, and Diagonal is sharp, indicating that the angles at which light exits the lens are similar, with minimal stray light outside of those angles.

Figure 17B:
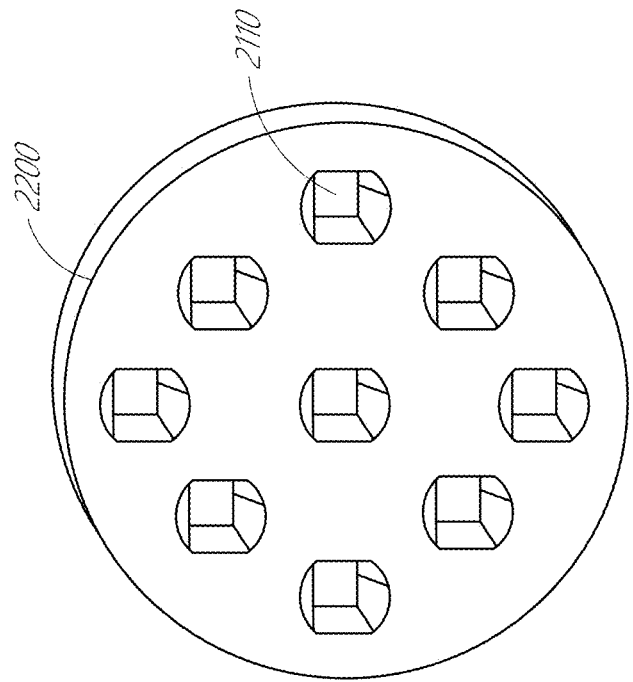
FIGS. 17A-17B illustrate perspective views of examples of arrays of the reflectors of FIGS. 14A-14C and 14D-14F, respectively.
Figure 17A:
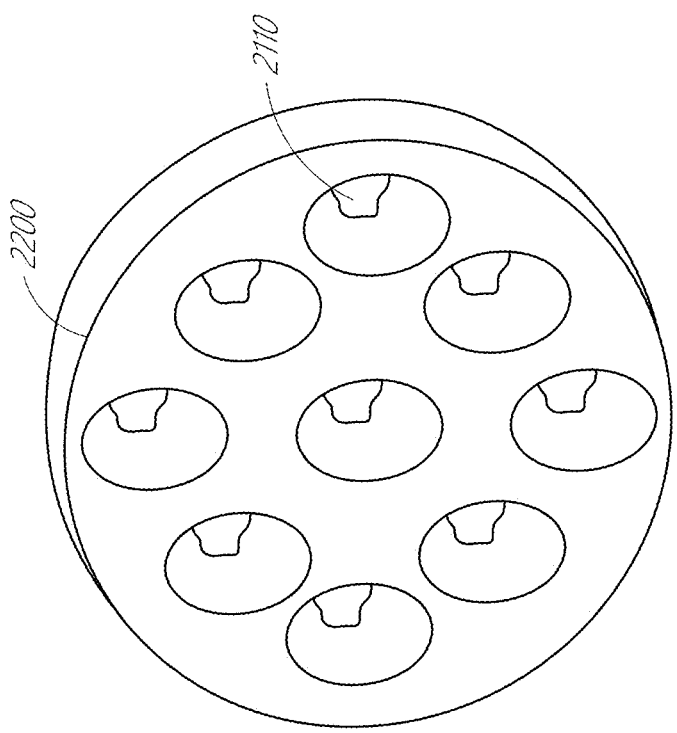

In some embodiments, the reflector and lens system may form part of an array of reflectors and lens. Because the reflector may simply be formed in an appropriately shaped volume, an array of reflectors may be formed in a single body of material. FIGS. 17A-17B illustrates perspective views of examples of arrays of the reflectors of FIGS. 14A-14C and 14D-14F, respectively. FIG. 17A shows reflectors having elliptical light output openings, and FIG. 17B shows reflectors having elongated output openings with straight and curved sides, as discussed with respect to FIGS. 14D-14F. In both FIGS. 17A and 17B, a plurality of the reflectors 2110 may be formed in a body of material 2200, e.g., a plate of material. While shown as being similar for ease of illustration, it will be appreciated that the sizes and/or shapes of the reflectors in the body 2200 may vary in some embodiments.

It will be appreciated that the body 2200 may be formed of various materials that have sufficient mechanical integrity to maintain the desired shape of the reflectors 2110. Examples of suitable materials include metals, plastics, and glasses. As discussed herein, the body 2200 may be a plate. In some embodiments, body 2200 is a continuous, unitary piece of material. In some other embodiments, the body 2200 may be formed by joining together two or more pieces of material.

The reflectors 2110 may be formed in the body 2200 by various methods. For example, the reflectors 2110 may be formed by machining the body 2200, or otherwise removing material to carve out the reflectors 2110. In some other embodiments, the reflectors 2110 may be formed as the body 2200 is formed. For example, the reflectors 2110 may be molded into the body 2200 as the body 2200 is molded into its desired shape. In some other embodiments, the reflectors 2110 may be formed by rearrangement of material after formation of the body 2200. For example, the reflectors 2110 may be formed by imprinting.

Once the contours of the reflectors 2110, the reflector volumes may undergo further processing to form inner surface having the desired degree of reflection. In some embodiments, the surface of the body 2200 may itself be reflective, e.g., where the body is formed of a reflective metal. In such cases, the further processing may simply include smoothing the interior surfaces of the reflectors 2110 to increase their reflectivity. In some other embodiments, the interior surfaces of the reflectors 2110 may be lined with a reflective coating.

will be appreciated that shaping the reflector 2110 as discussed above allows the light output of the reflector to be shaped in angle space and provides an asymmetrical angular distribution. Advantageously, the reflector shape may be used to provide light output that matches the desired display aspect ratio, as noted herein. In some other embodiments, the desired aspect ratio may be achieved using a mask placed forward of the lens.

Figure 18:
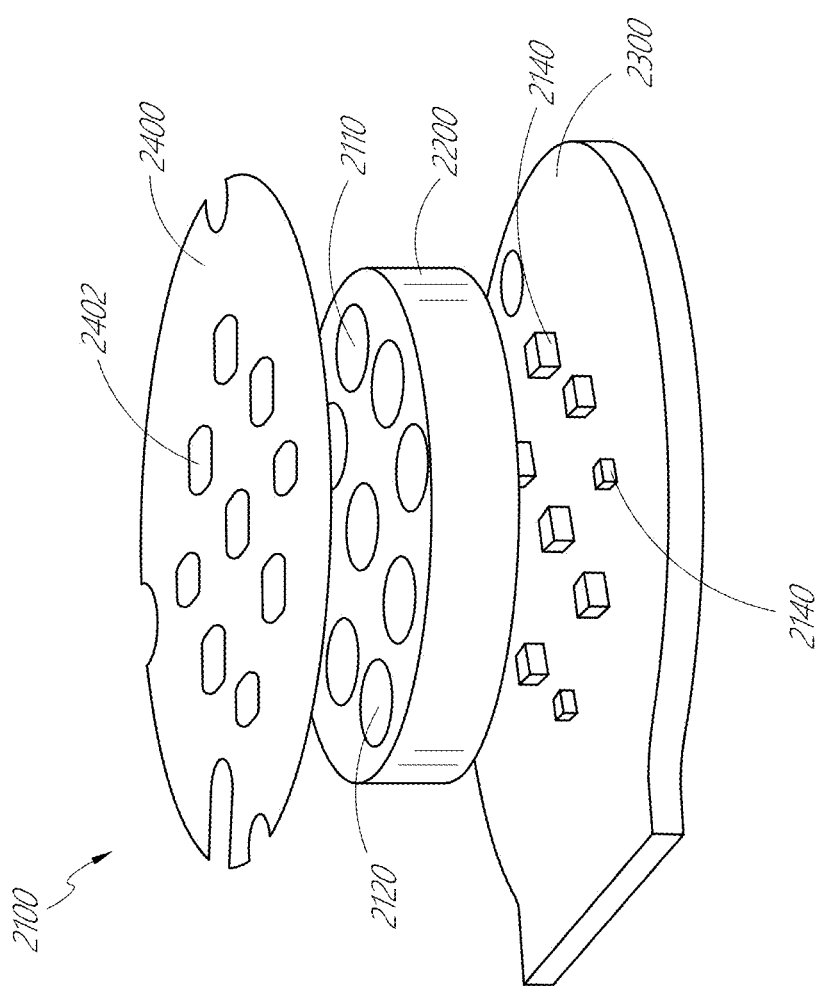
FIG. 18 illustrates a perspective view of an example of an optical system having arrays of light emitters, reflectors, and lens, and a mask.

FIG. 18 illustrates a perspective view of an example of an optical system having arrays of light emitters 2140, reflectors 2110, and lens 2120, and a mask 2400. In some embodiments, the light emitters 2140 are mounted on a supporting substrate 2300, e.g., a printed circuit board. The spatial layout of the light emitters 2140 and the reflectors 2110 are preferably matched, such that each light emitter 2140 is vertically aligned with an individual corresponding reflector 2110. In some embodiments, the arrays of light emitters 2140, reflectors 2110, and lens 2120, and optionally the mask 2400 may form the light module 540 (FIG. 6).

In some embodiments, the light emitters 2140 may all be similar. In some other embodiments, at least some of the light emitters 2140 may be different, e.g., some light emitters may output light of a different wavelength or range of wavelengths from other light emitters. For example, the light emitters 2140 may form groups of light emitters, e.g., three groups of light emitters, with each group emitting light of wavelengths corresponding to a different color (e.g., red, green, and blue). In some embodiments, more than three groups of light emitters (for emitting light of more than three different ranges of wavelengths) may be present. The different groups of light emitters may be utilized to provide light of different component colors for a display system, such as the display system 250 (FIG. 6). For example, light emitters of each group may be utilized to emit the light rays 770, 780, 790 (FIGS. 9A-9B).

In some embodiments, the light emitters, reflectors, and lens are utilized to provide light to the stack of waveguides 660 (FIGS. 9A-9C). In such embodiments, in addition to a match between the spatial layout of the light emitters 2140 and the spatial layout of the reflectors 2110, the light emitters 2140 and the reflectors 2110 are preferably also arranged to match the spatial layout of incoupling optical elements (e.g., incoupling optical elements 700, 710, 720) in the stack of waveguides 660. Preferably, the spatial layout of the light emitters 2140 and reflectors 2110 match the spatial layout of the incoupling optical elements 700, 710, 720 such that the spatial arrangement of the reflectors 2110, as seen in a plan view, corresponds one-to-one with a spatial arrangement of the light incoupling optical elements 700, 710, 720. With such an arrangement, light from a particular light emitter may be reliably directed into an associated one of the waveguides 670, 680, 690, without being directed into others of the waveguides 670, 680, 690.

With continued reference to FIG. 18, with the optical system 2100 oriented as illustrated, the light input opening of the reflector is at a bottom of the body 2200, and the light output opening is at the top of the body 2200. Preferably, the lower surface of the body 2200 is contoured to lay flat on the upper surface of the substrate 2300, such that light does not significantly propagate into a reflector 2110 from light emitters other than the reflectors matching light emitter. Advantageously, both the lower surface of the body 2200 and the supper surface of the substrate 2300 may be flat, which facilitates a tight fit at the interface between the body 220 and the substrate 2300, which may prevent undesired stray light from reaching individual reflectors 2110.

Lenses 2120 are provided at the light output openings of the reflectors 2110. As illustrated, each reflector 2110 has an individual associated lens 2120. In some other embodiments, some or all of the lenses may be formed in a single sheet of material. In such embodiments, the sheet of material is preferably thin, e.g., sufficiently thin to minimize light leakage between reflectors, while maintaining sufficient structural integrity to hold the lenses together.

With continued reference to FIG. 18, the mask 2400 is provided forward of the lenses 2120. The mask 2400 has openings 2402, e.g., cutouts, in the desired shape for the light output. Thus, the mask 2400 may be utilized for spatial light shaping. Openings 2402 preferably have a smaller area than the light output openings of the reflectors. In some embodiments, the mask surface facing into the reflector (e.g., the bottom surface of the mask 2400) is reflective, which may increase the efficiency and brightness of the light module comprising the light emitter 2140, reflector 2110, and lens 2120. In some other embodiments, the bottom surface is absorptive, which, by preventing random reflections between the bottom surface of the mask and the reflector 2110, may provide a higher degree of control over the paths of light passing through the openings 2402 from the reflector 2110.

Figure 19:
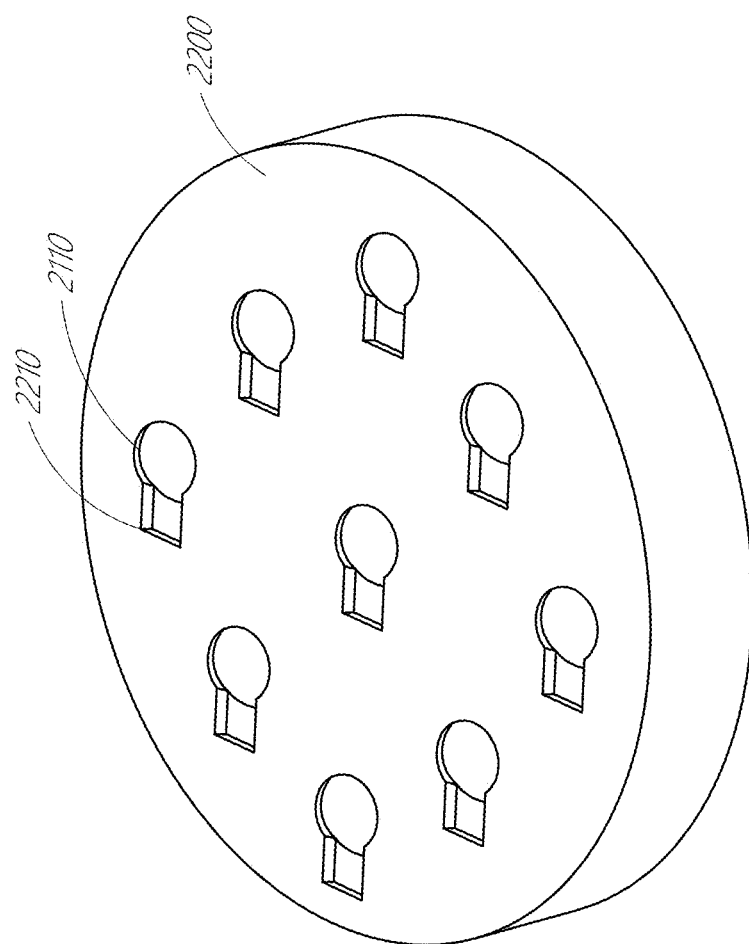
FIG. 19 illustrates a perspective view of an example of body of material having an array of reflectors and indentations for light emitter structures such as wiring.

In addition to defining the contours of the reflectors 2110, the body 2200 may include other structures for other purposes. FIG. 19 illustrates a perspective view of an example of the body 2200 having an array of reflectors 2110 and indentations 2210 for light emitter structures such as wiring. The indentations 2210 are shaped and have a depth such that they can accommodate portions of a light emitter 2140 (FIG. 18) or structures connected to the light emitter 2140, so that the body 2200 may fit tightly against the substrate 2300 without light leakage. As with the reflectors 2110, the indentations 2210 may be formed by various methods, include machining, molding, and imprinting.

In some embodiments, the body 2200 may have a uniform thickness. In some other embodiments, the thickness of the body 2200 may vary. FIGS. 20A-20B illustrate perspective views of examples of the body 2200 of material having reflectors with different heights. Because the reflectors extend completely through the body 2200, different heights for the reflectors may be achieved by setting the thickness of the body 2200 at different heights. As an example, FIGS. 20A-20B illustrate three heights or levels 2200a, 2200b, and 2200c. It will be appreciated that fewer or more levels may be provided as desired, and the levels may be arranged differently from that illustrated in some embodiments.

The different heights for the reflectors 2110 may provide advantages in applications in which different groups of light emitters 2140 (FIG. 18) emit light of different wavelengths. Light of different wavelengths may focus at different distances from the corresponding light emitter 2140. As a result, reflectors 2110 with different heights that are selected based on the distance that the light is best focused may be expected to provide improvements in image quality where the light emitters 2140, reflectors 2110, and lenses 2120 are used in a display system. In some embodiments, where the lens 2120 is positioned one focal length from the associated light emitter 2140, the distance corresponding to one focal length may vary with the wavelength of the emitted light, and the thickness of the part of the body 2200 accommodating that light emitter 2140 and the associated reflector 2110 and lens 2120 may be selected to allow placement of the lens 2120 at the appropriate one focal length distance from the light emitter 2140.

In some other embodiments, the reflectors 2110 may all have the same height and the lens 2120 for different groups of light emitters 2140 may be different. For example, the lens 2120 for different groups of light emitters 2140 may be configured to have different focal lengths, to account for differences caused by light of different wavelengths.

Figure 21A:
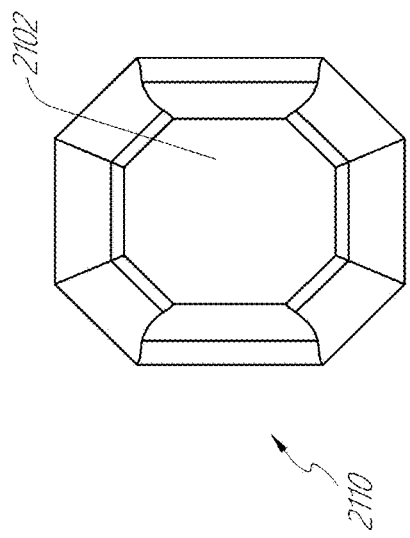
FIGS. 21A-21E illustrates various views of an example of a reflector.
Figure 21B:
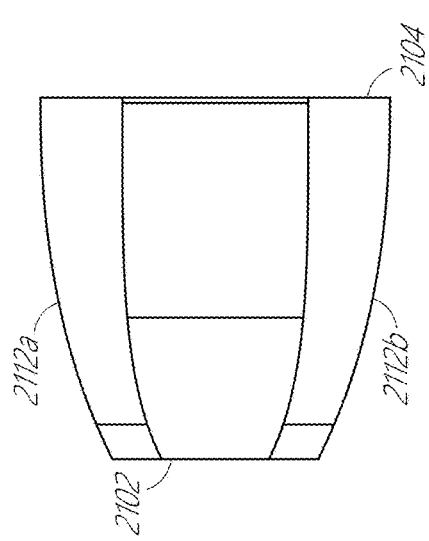
Figure 21C:
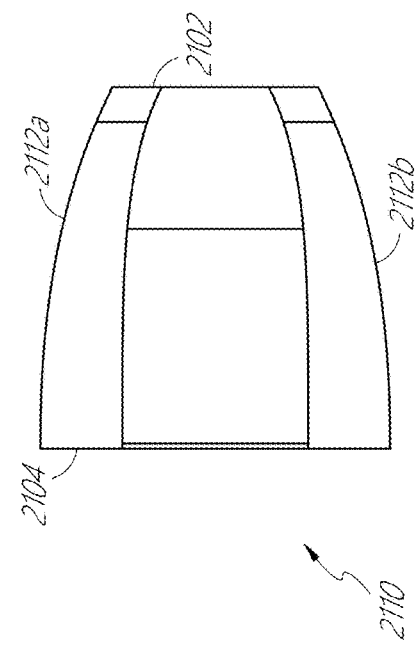
Figure 21D:
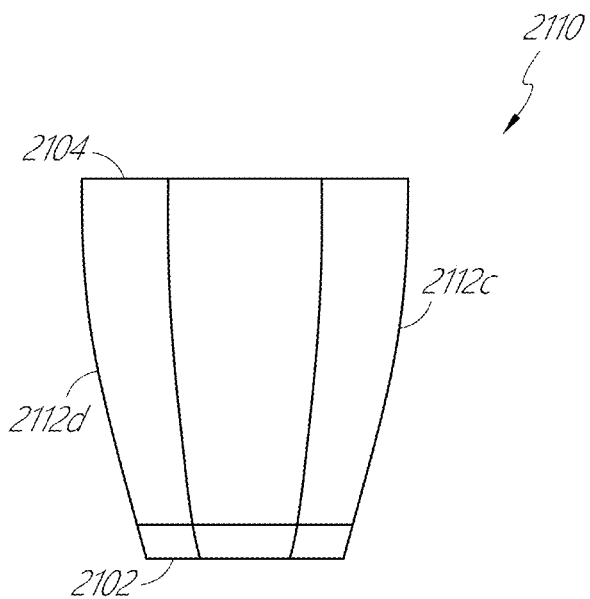
Figure 21E:
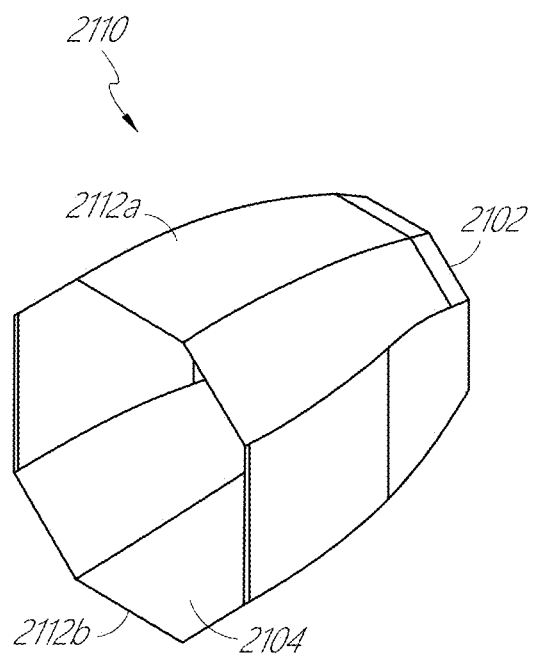

With reference now to FIGS. 21A-21E, various views of an example of a reflector 2110 are illustrated. It will be appreciated that the reflector 2110 may assume various shapes that follow a CPC profile. In some embodiments, the reflector 2110 may be formed by a plurality of sides, or facets, each of which has a CPC profile as seen in a side view; that is, in some embodiments, all interior sides of the reflector 2110 may have a CPC profile, when each side is seen in a side view. The view of FIG. 21A shows the reflector 2110 as seen looking down on the reflector from the light input opening end of the reflector. The views of FIGS. 21B and 21C show the reflector 2110 as seen from opposing sides. The view of FIG. 21D shows the reflector 2110 as seen from a side orthogonal to the sides seen in views B and C. The view of FIG. 21E shows a perspective view of the reflector 2110 as viewed from the light output end of the reflector. The sidewalls 2112A and 2112B may both have CPC profiles, and the sidewalls 2112C and 2112D may also both have CPC profiles. In addition, all other sides may have a CPC profile as seen in side views. In addition, in some embodiments, as can be seen in the views of FIGS. 21A and 21E, each side of the reflector 2110 is linear or flat, when viewed in a cross-sectional view taken along a plane transverse to the height axis (extending from an input end 2102 to an output end 2104) of the reflector 2110.

In some embodiments, two opposing sides, e.g., sides 2112 C and 2112 D or sides 2112a and 2112b have the same CPC profile, but that profile differs from the CPC profile of all other sides. In addition, all the other sites may have the same CPC profile. Thus, in some embodiments the curvature of all interior sides of the reflector 2110 may be the same except for that of a pair of opposing interior sides. In some other embodiments, as noted herein, the interior sides of the reflector 2110 may follow other contours, including that of an ellipse, hyperbola, or biconic shape, or may be substantially linear from an input end 2102 to an output end 2104 of the reflector 2110.

Preferably, the total number sides is an even number, for example 4, 6, 8, 10, 12, etc. In some embodiments, the total number of sides may be 8 or greater, which has been found to provide exceptionally spatially uniform light output.

It will be appreciated that the light input opening 2102 may be sized to accommodate the underlying light emitter. In some embodiments, the light emitter may have a maximum width of about 500 µm or greater, 600 µm or greater, 700 µm or greater, or 800 µm or greater. In some embodiments, the light input opening 2102 may have a maximum width of 500 µm or greater, 600 µm or greater, 700 µm or greater, 800 µm or greater, 900 µm or greater, or 1 mm or greater. In some embodiments, the light input opening 2102 has a width that is less than 2 mm, less than 1.5 mm, or less than 1 mm.

Figure 22B:
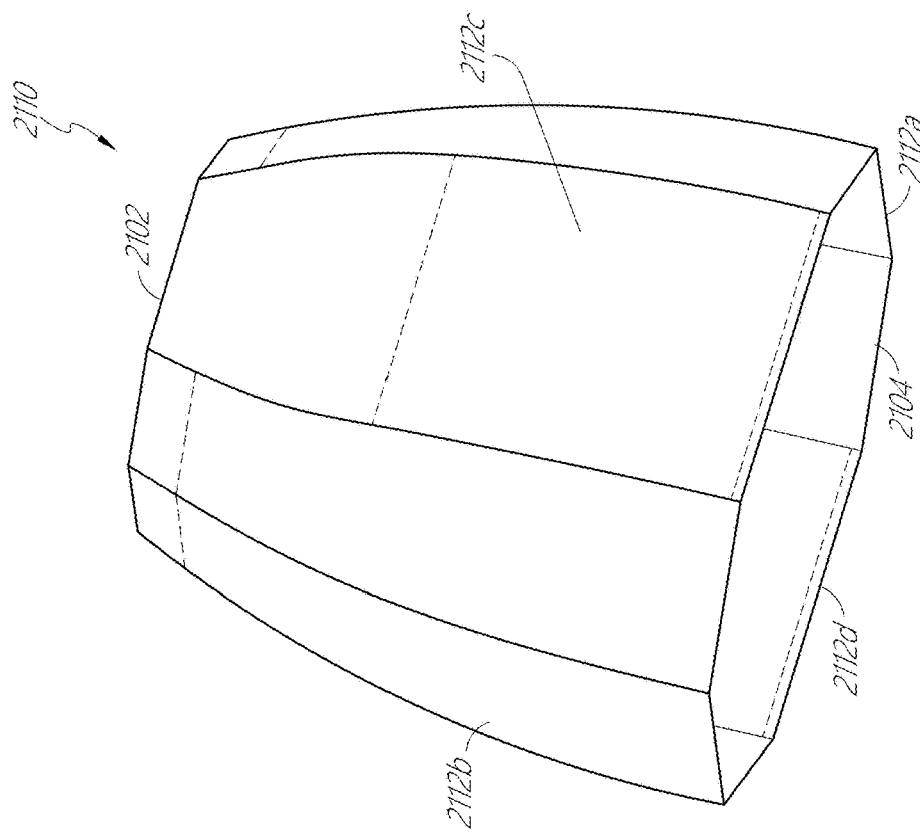
FIGS. 22A-22B illustrate additional perspective views of the reflector of FIG. 21.
Figure 22A:
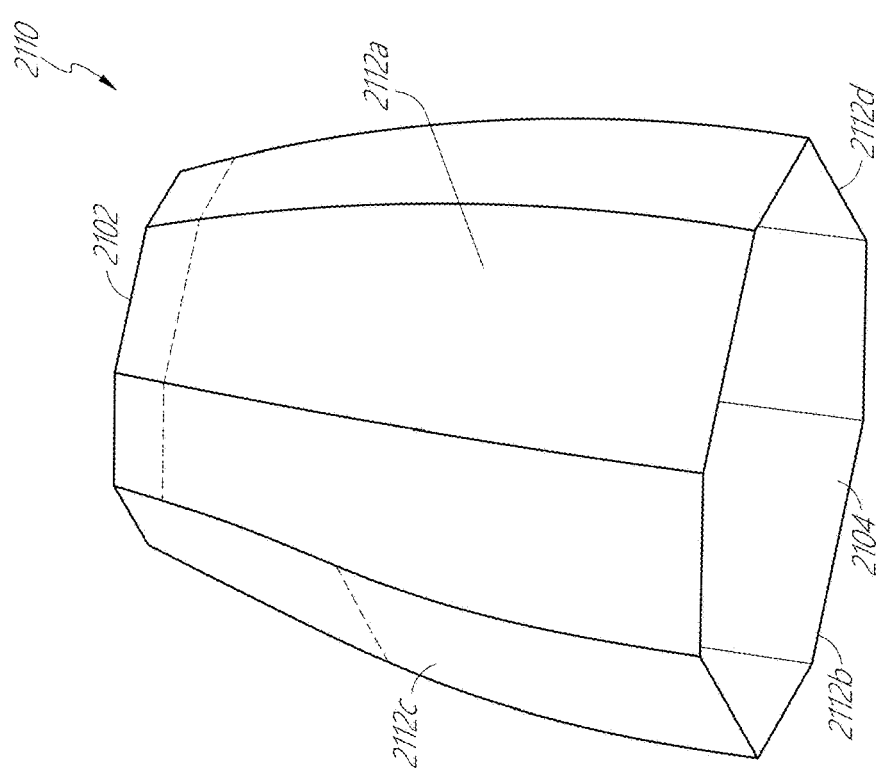
Figure 22D:
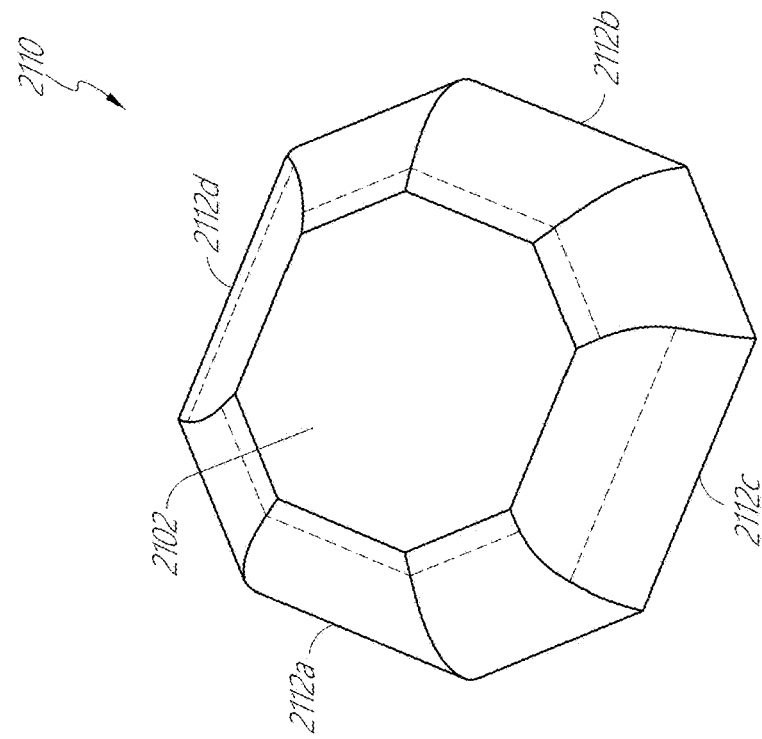
FIGS. 22C-22D illustrate perspective views of the reflector of FIG. 21 as seen from the light output opening side and the light input opening side, respectively, of the reflector.
Figure 22C:
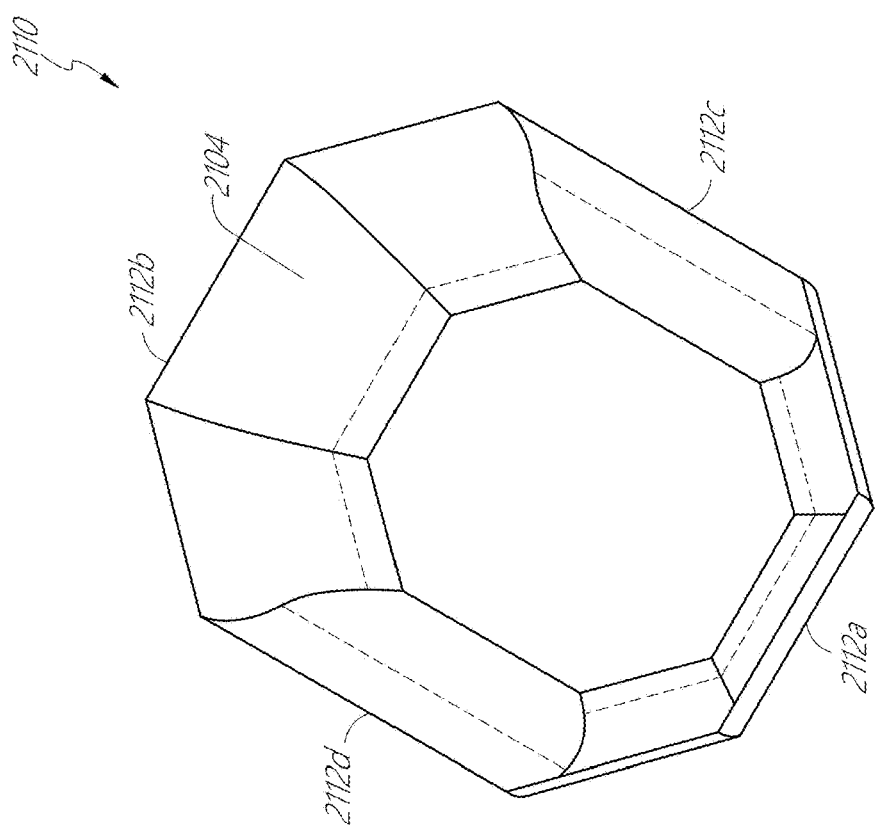

FIGS. 22A-22B illustrate additional perspective views of the reflector 2110 of FIG. 21. FIGS. 22C-22D illustrate yet other additional perspective views of the reflector of FIG. 21 as seen from the light output opening side and the light input opening side, respectively, of the reflector 2110.

Figure 23A:
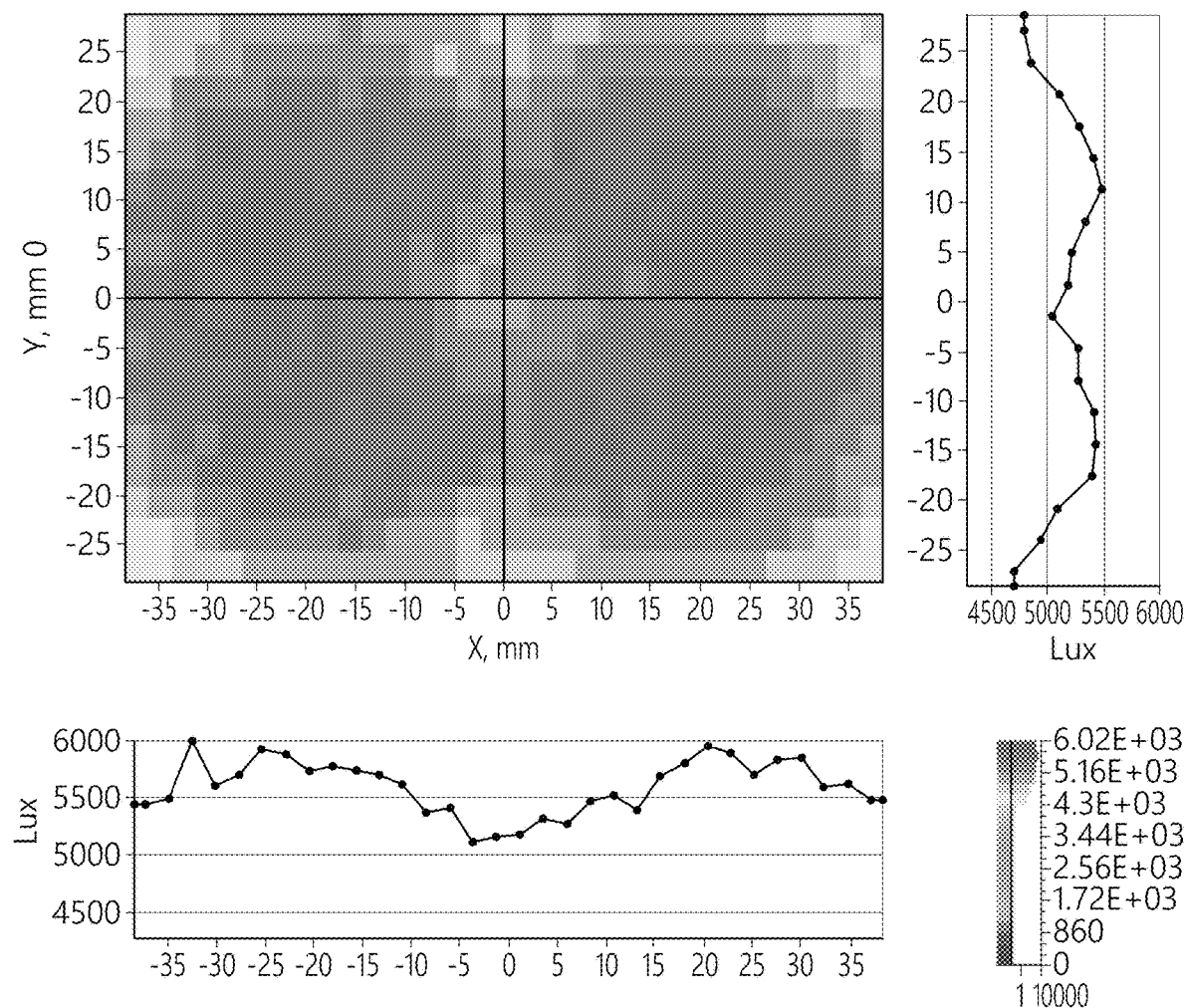
FIGS. 23A and 23B illustrate examples of uniformity maps for the light output of the reflectors of having rounded profiles and having sharp corners at the intersections of interior sidewalls, respectively.
Figure 23B:
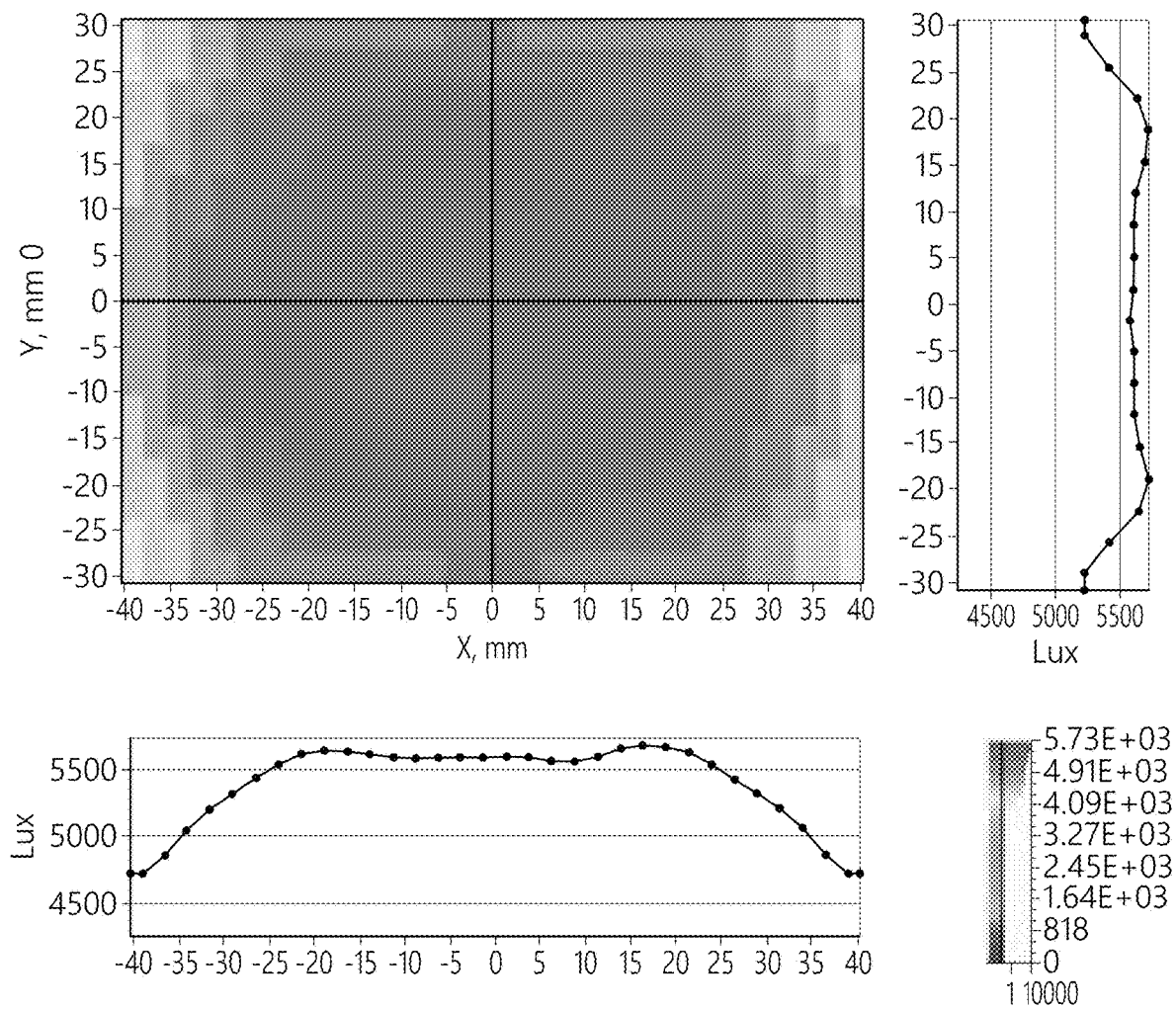

FIGS. 23A and 23B illustrate examples of uniformity maps for the light output of a reflector having a rounded profile (as seen in cross-sections taken along a plane transverse to the height axis of the reflector) and a reflector having sharp corners at the intersections of substantially linear interior sidewalls (as seen in cross-sections taken along a plane transverse to the height axis of the reflector), respectively. Undesirably, as shown in FIG. 23A, the rounded profile reflector provides light output having an area of low intensity in the middle of the map. While this low intensity area is undesirable in itself, it will be appreciated that the middle of the map may also be the center of the viewer's field of view, and the viewer may have especially high sensitivity to nonuniformities in this area. Advantageously, as shown in FIG. 23B, an 8-sided reflector having sharp corners and CPC profiles for each side, as discussed above regarding FIGS. 21-22D, provides highly uniform light output.

Various example embodiments of the invention are described herein. Reference is made to these examples in a non-limiting sense. They are provided to illustrate more broadly applicable aspects of the invention. Various changes may be made to the invention described and equivalents may be substituted without departing from the spirit and scope of the invention.

For example, while advantageously utilized with AR displays that provide images across multiple depth planes, the augmented reality content disclosed herein may also be displayed by systems that provide images on a single depth plane.

In addition, while advantageously applied as a light source for display systems, the reflector and lens system disclosed herein may be utilized in other applications where high spatially uniform light is desired. Moreover, while the simply mechanical construction of the reflector and lens facilitates their use in arrays of reflectors and lens, the reflectors and systems may also be used in an optical system with a single reflector and associated lens.

It will also be appreciated that, while the reflector 2110 (FIG. 14 C) may have a notch 2114 to accommodate connectors such as wire bonds for a light emitter, in some other embodiments, the notch 2014 may be eliminated. For example, the sidewall 2112c may continue to the same level as other sidewalls of the reflector 2110. In such embodiments, a light emitter that does not have a protruding wire bond may be utilized, and the sidewalls of the reflector 2110 may extend to contact a substrate, such as a printed circuit board, supporting the light emitter. An example of a light emitter without a protruding wire bond is a flip chip LED. It has been found that the wire bond extending over the light emitter may cause a shadow that produces visible artifacts in images formed using the light emitter. Advantageously, eliminating the wire bond and extending the reflector sidewalls to the light emitter substrate may eliminate such artifacts and improve image quality.

In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events that is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. A head-mounted display system comprising:
   a reflector comprising:
      an input end;
      an output end;
      an even number of faceted sides extending between the input end and the output end, wherein two opposing sides of the reflector define a first curved cross-sectional profile and two other opposing sides of the reflector define a second curved cross-sectional profile different from the first cross-sectional profile;
   a lens located one focal length of the lens away from the input end of the reflector;
   a light modulating device configured to receive and to modulate light passing through the lens to form image light; and
   a stack of waveguides, wherein each waveguide of the stack comprises:
      a light incoupling optical element configured to incouple image light modulated by the light modulating device; and
      a light outcoupling optical element,
      wherein light incoupling optical elements of different waveguides, as seen in a top-down plan view, are laterally offset from one another.

2. The head-mounted display system of claim 1, wherein the reflector is one of an array of reflectors.

3. The head-mounted display system of claim 2, further comprising a plurality of light emitters, wherein each of the array of reflectors has an associated one of the plurality of light emitters disposed at an input end of the each of the reflectors.

4. The head-mounted display system of claim 3, wherein some of the plurality of light emitters are configured to emit light of different wavelengths than others of the plurality of light emitters.

5. The head-mounted display system of claim 3, wherein the light emitters are light emitting diodes.

6. The head-mounted display system of claim 1, wherein the lens is disposed at the output end of the reflector, wherein the reflector extends one focal length of the reflector.

7. The head-mounted display system of claim 1, wherein the first cross-sectional profile is a first compound parabolic concentrator (CPC) profile.

8. The head-mounted display system of claim 7, wherein the second cross-sectional profile is a second compound parabolic concentrator (CPC) profile, wherein the first and the second CPC profiles are different.

9. The head-mounted display system of claim 1, wherein the light modulating device comprises a spatial light modulator.

10. The head-mounted display system of claim 9, wherein the spatial light modulator comprises a liquid crystal display (LCD).

11. The head-mounted display system of claim 10, wherein the liquid crystal display is a liquid crystal on silicon (LCoS) display.

12. The head-mounted display system of claim 9, further comprising a mask between the reflector and the spatial light modulator, wherein the mask has an opening smaller than the output end.

13. The head-mounted display system of claim 12, wherein the mask is between the lens and the spatial light modulator.

14. The head-mounted display system of claim 12, wherein the mask has a mask surface facing the reflector, wherein the mask surface is absorptive.

15. The head-mounted display system of claim 1, wherein a cross-sectional shape of the input end is different from a cross-sectional shape of the output end.

16. The head-mounted display system of claim 1, wherein the lens is one of a plurality of lenses, wherein the reflector is one of a plurality of reflectors formed by sidewalls of openings extending through a thickness of a common unitary body, wherein each reflector has an associated lens of the plurality of lenses forward of the output opening of the reflector.

17. The head-mounted display system of claim 16, wherein the unitary body has a multi-tiered surface, wherein some reflectors have output openings on a different tier than other reflectors.

18. The display system of claim 17, wherein each reflector has an associated light emitter, wherein some light emitters are configured to emit light of different wavelengths than other light emitters, wherein a height of the tiers varies with a wavelength of light emitted by an associated light emitter.

* * * * *